(12) United States Patent
Wright et al.

(10) Patent No.: US 7,940,271 B2
(45) Date of Patent: May 10, 2011

(54) SYSTEM AND METHOD FOR LARGE SCALE INFORMATION ANALYSIS USING DATA VISUALIZATION TECHNIQUES

(75) Inventors: William Wright, Toronto (CA); Alexander Skaburskis, Toronto (CA); Eric Hall, Toronto (CA)

(73) Assignee: Oculus Info Inc., Toronto (CA)

( * ) Notice: Subject to any disclaimer, the term of this patent is extended or adjusted under 35 U.S.C. 154(b) by 2 days.

(21) Appl. No.: 11/369,854

(22) Filed: Mar. 8, 2006

(65) Prior Publication Data

US 2006/0221077 A1 Oct. 5, 2006

Related U.S. Application Data

(60) Provisional application No. 60/659,089, filed on Mar. 8, 2005.

(51) Int. Cl.
*G06T 11/20* (2006.01)
(52) U.S. Cl. ............... 345/440; 345/428; 348/14.12; 382/298
(58) Field of Classification Search .......... 345/440, 345/428; 348/14.12; 382/298
See application file for complete search history.

(56) References Cited

U.S. PATENT DOCUMENTS

| | | | | |
|---|---|---|---|---|
| 4,562,450 A | * | 12/1985 | Ellis et al. | 345/68 |
| 5,432,891 A | * | 7/1995 | Onodera | 358/1.15 |
| 5,453,844 A | * | 9/1995 | George et al. | 382/264 |
| 5,469,187 A | * | 11/1995 | Yaniv | 345/98 |
| 5,680,525 A | * | 10/1997 | Sakai et al. | 345/585 |
| 5,787,239 A | * | 7/1998 | Horie et al. | 358/1.15 |
| 6,026,197 A | * | 2/2000 | Ohsawa et al. | 382/240 |
| 6,348,933 B1 | * | 2/2002 | Walls et al. | 715/744 |
| 6,502,107 B1 | * | 12/2002 | Nishida | 707/104.1 |
| 6,529,642 B1 | * | 3/2003 | Lai et al. | 382/298 |
| 6,560,647 B1 | | 5/2003 | Hafez et al. | |
| 6,611,241 B1 | * | 8/2003 | Firester et al. | 345/1.3 |
| 6,850,267 B2 | * | 2/2005 | Hiroi et al. | 348/14.12 |
| 6,912,326 B2 | * | 6/2005 | Lai et al. | 382/298 |
| 6,999,045 B2 | * | 2/2006 | Cok | 345/1.3 |
| 7,277,103 B2 | * | 10/2007 | Kurumisawa et al. | 345/690 |

(Continued)

OTHER PUBLICATIONS

Li, K.; Chen, H.; Chen, Y.; Clark, D.W.; Cook, P.; Damianakis, S.; Essl, G.; Finkelstein, A.; Funkhouser, T.; Housel, T.; Klein, A.; Liu, Z.; Praun, E.; Singh, J.P.; Shedd, B.; Pal, J.; Tzanetakis, G.; Zheng, J.;Building and using a scalable display wall system Computer Graphics and Applications, IEEE vol. 20, Issue 4, Jul.-Aug. 2000 pp. 2.*

(Continued)

*Primary Examiner* — Javid A Amini
(74) *Attorney, Agent, or Firm* — Grant Tisdall; Gowling Lafleur Henderson LLP

(57) ABSTRACT

A system and method for processing a stored original data set for subsequent display on a user interface of a computer, the original data set having multiple dimensions and a number of original data points greater than the number of pixels available on the user interface. The system comprises a data reduction module for reducing the original data set to produce a reduced data set having less than the number of original data points, a data resizing module for dynamically resizing the received reduced data set to produce a resized data set for use in generating a display of pixels appropriate to the number of available pixels, and a pixel module configured for using a predefined color scale for assigning a unique color as the representative pixel value of a respective data value of the resized data points included in the display of pixels.

16 Claims, 16 Drawing Sheets

U.S. PATENT DOCUMENTS

| | | | |
|---|---|---|---|
| 7,365,748 B2 * | 4/2008 | Suen et al. | 345/428 |
| 2002/0067341 A1 * | 6/2002 | Kobayashi | 345/157 |
| 2003/0218620 A1 * | 11/2003 | Lai et al. | 345/670 |
| 2005/0030255 A1 * | 2/2005 | Chiu et al. | 345/1.3 |
| 2005/0038884 A1 | 2/2005 | Boylan et al. | |
| 2005/0125488 A1 * | 6/2005 | Kulkarni et al. | 709/201 |
| 2005/0265577 A1 * | 12/2005 | DeCegama | 382/100 |
| 2005/0285880 A1 * | 12/2005 | Lai et al. | 345/660 |
| 2006/0107616 A1 * | 5/2006 | Ratti et al. | 52/750 |
| 2006/0148569 A1 * | 7/2006 | Beck | 463/43 |

OTHER PUBLICATIONS

Erbacher R F Ed—Institute of Electrical and Electronics Engineers: "Intrusion behavior detection through visualization" 2003 IEEE International Conference on Systems, Man and Cybernetics. SMC'03. conference Proceedings. Washington, DC, Oct. 5-8, 2003, IEEE International Conference on Systems, Man, and Cyernetics, New York, NY : IEEE, US, vol. 5 of 5, Oct. 5, 2003 pp. 2507-2513, XP010667994 ISBN: 0-7803-7952-7 *paragraphs [0001], [0003], [0004], [0005].

Kosara R et al: "An Interaction View on Information Visualization" Eurographics, Springer Verlag, Vienna, AT, 2003, pp. 1-15, XP007901510 ISSN: 0946-2767 *paragraphs [0001], [0003], [0004], [0005] *.

European Search Report, Application No. 06251226.4-2416, Applicant Oculus Info Inc.

* cited by examiner

```
//find the next point after (x,y) in the pixel record buffer
// using the axis
NextPoint(x,y) {
    for( each row in the axis)
    p = the point on or after x using the tree
    if( p == null )
        continue to the next row
    else
        return p
}

//render the rectangular region defined by the top left
// corner (x_1,y_1) and the bottom right corner (x_2, y_2)
RenderRegion(x_1,y_1,x_2,y_2) {
    p = NextPoint(x_1,y_1)
    for( each point in the pixel record buffer starting at p) {
        If( p.x < x_1 )
            p = NextPoint(x_1,p.y)
        else if( p.x > x_2 )
            p = NextPoint(x_1,p.y + 1)
        else {
            render p
            p = next point in pixel record buffer
        }
    }
}
```

SYSTEM AND METHOD FOR LARGE SCALE INFORMATION ANALYSIS USING DATA VISUALIZATION TECHNIQUES (This application claims the benefit of U.S. Provisional Application No. 60/659,089, filed March 8, 2005, herein incorporated by reference.)

This application relates generally to data visualization of large data sets through data reduction techniques.

BACKGROUND

Computer network security specialists have a need for dealing with the massive amounts of data that are propagated through computer networks. The detection of network intrusions and misuse can be characterized as a problem of identifying suspicious patterns in a plethora of data. This kind of recognition task is well suited to visualization, wherein the human visual system is an unparalleled pattern recognition engine. There has been little work done in the area of visualizing large amounts of raw network data. Scatter plots are used for visualizing network data, but few can manage extremely large numbers of data points.

The primary known visualization techniques are variations on a node-and-link architecture. These techniques can be an effective way for visualizing connections between computers, but two considerations make the techniques ill-suited for the purpose of visualising large amounts of network data. First, two dimensions are used to locate the nodes. This can be valuable if either the position or distance provide meaningful data. However in a two-dimensional image it makes additional dimensions such as time difficult to represent clearly, in three dimensions occlusion and redundancy can become confounding issues. Second, due to the massive amount of data, the node-and-link representation often does not achieve the density possible with a bitmap, consider that in a two dimensional digital image it is difficult to visually represent more distinct data points than the number of pixels used to draw that image.

Of the three main example commercial network forensics tools available today, only one, eTrust, by Computer Associates, the successor of SilentRunner, emphasizes visualization techniques [2]. Most of the visualizations eTrust provides are based on a node and link foundation and few show raw network packets, instead indicating reconstructed sessions or other higher level data. Despite the generally good quality of eTrusts visualizations, a recent review of the latest version complains that none of them scale to handle larger data sets [3]. The article claims the most robust of the visualizations, the N-gram file clustering, is useful for thousands of data points, not tens-of-thousands.

Erbacher developed a glyph based network visualization [1]. It is a two-dimensional node-and-link visualization. The local network appears towards the bottom of the image and remote connections are placed above with their distance based on locality and criticality. To increase the dimensionality of the visualization the nodes and links are decorated according to the values of other parameters. For example a node's inner circle thickness represents the load on the system and the style and colour of the link represents the type of connection. This visualization is valuable as a view into the current state of the network, however it is not designed for post-mortem network analysis of captured data including temporal analysis of network traffic. Instead the analyst must make a temporal accommodation to find the patterns in a playback of the data.

Finally the NIVA visualization [4] provides a three dimensional node-and-link visualization that provides extra dimensions through colour and node size. This system was developed to explore the inclusion of haptic technology into the visualization methods of intrusion detection problems. In this visualization the usual layout maps three components of an IP address to spatial coordinates and the fourth to the size or colour of the node. The NIVA visualization also uses a helix layout technique to map a sequential data dimension to positions along a helical path. It appears that these visualizations are intended primarily for finding attacks targeted at a single system.

1 Erbacher, Robert F., Zhouxuan Teng, and Siddharth Pandit, "Multi-Node Monitoring and Intrusion Detection," *Proceedings of the IASTED International Conference On Visualization, Imaging, and Image Processing*, Malaga, Spain, Sep. 9-12, 2002, pp. 720-725.

2 eTrust™ Network Forensics Release 1.0, Dec. 2004, http://www3.ca.com/Files/DataSheets/etrust_network-forensics_data_sheet.pdf 3 Shipley, Greg. "Body of Evidence" *Secure Enterprise*, Sep. 15, 2004.

4 Nyarko, Kofi, et al., "Network Intrusion Visualization with NIVA, an Intrusion Detection Visual Analyzer with Haptic Integration" *Proceedings of the* 10*th Symposium on Haptic Interfaces for Virtual Environment and Teleoperator Systems*, Mar. 24-25, 2002, pp. 277-285.

SUMMARY

The systems and methods as disclosed herein provide a summary aggregation technique for large data sets to obviate or mitigate at least some of the above presented disadvantages.

A system and method for processing a stored original data set for subsequent display on a user interface of a computer, the original data set having multiple dimensions and a number of original data points greater than the number of pixels available on the user interface for displaying a representative pixel value for the data value of each of the original data points. The system comprises a data reduction module for reducing the original data set to produce a reduced data set having a number of reduced data points less than the number of original data points. The number of reduced data points is based on a received query parameter including at least one of available memory of the computer, a range of a continuous dimension of the multiple dimensions, and a level of detail for at least one dimension other than the continuous dimension. The system includes a data resizing module for dynamically resizing the received reduced data set to produce a resized data set suitable for use in generating a display of pixels appropriate to the number of available pixels. The data resizing module is configured for summing or otherwise combining the individual data values of selected adjacent ones of the reduced data points in the reduced data set and assigning the summed value to a respective data value of a resized data point in the resized data set. The system also has a pixel module configured for using a predefined colour scale for assigning a unique colour as the representative pixel value of the respective data value of a resized data point included in the display of pixels, such that the colour scale is configured for defining a plurality of the unique colours to different data values of the individual resized data points.

One aspect provided is a system for processing a stored original data set for subsequent display on a user interface of a computer, the original data set having multiple dimensions and a number of original data points greater than the number of pixels available on the user interface for displaying a display of pixels for representing the data values of each of the original data points, the system comprising: a data reduction module for reducing the original data set to produce a reduced data set having a number of reduced data points less than the number of original data points, the number of reduced data points based on a received query parameter including at least one of available memory of the computer, a range of a continuous dimension of the multiple dimensions, and a level of detail for at least one dimension other than the continuous dimension; a data resizing module for dynamically resizing the received reduced data set to produce a resized data set suitable for use in generating the display of pixels appropriate to the number of available pixels in the display of pixels, the module configured for combining the individual data values of selected adjacent ones of the reduced data points in the reduced data set and assigning a combined value based on the combining to a corresponding resized data point in the resized data set, the resized data set having a number of resized data points less than the number of reduced data points; and a pixel module configured for using a predefined colour scale for assigning a unique colour of a plurality of colours to the combined value of the resized data point included in the display of pixels.

A further aspect provided is a method for processing a stored original data set for subsequent display on a user interface of a computer, the original data set having multiple dimensions and a number of original data points greater than the number of pixels available on the user interface for displaying a display of pixels for representing the data values of each of the original data points, the method comprising the steps of: reducing the original data set to produce a reduced data set having a number of reduced data points less than the number of original data points, the number of reduced data points based on a received query parameter including at least one of available memory of the computer, a range of a continuous dimension of the multiple dimensions, and a level of detail for at least one dimension other than the continuous dimension; dynamically resizing the received reduced data set to produce a resized data set suitable for use in generating the display of pixels appropriate to the number of available pixels in the display of pixels by combining the individual data values of selected adjacent ones of the reduced data points in the reduced data set, the resized data set having a number of resized data points less than the number of reduced data points; assigning a combined value based on the combining to a corresponding resized data point in the resized data set; and applying a predefined colour scale for assigning a unique colour of a plurality of colours to the combined value of the resized data point included in the display of pixels.

A further aspect provided is a system and method for processing a stored original data set for subsequent display on a user interface of a computer, the original data set having multiple dimensions and a number of original data points greater than the number of pixels available on the user interface for displaying a display of pixels for representing the data values of each of the original data points, the system comprising a data reduction module for reducing the original data set to produce a reduced data set having a number of reduced data points less than the number of original data points, the number of reduced data points based on a received query parameter including at least one of available memory of the computer, a range of a first dimension of the multiple dimensions, and a level of detail for at least one dimension other than the first dimension.

A further aspect provided is a system and method for processing a reduced data set for subsequent display on a user interface of a computer, the reduced data set having multiple dimensions and a number of reduced data points greater than the number of pixels available on the user interface for displaying a display of pixels for representing the data values of each of the reduced data points, the system comprising a data resizing module for dynamically resizing the reduced data set to produce a resized data set suitable for use in generating the display of pixels appropriate to the number of available pixels in the display of pixels, the module configured for combining the individual data values of selected adjacent ones of the reduced data points in the reduced data set and assigning a combined value based on the combining to a corresponding resized data point in the resized data set, the resized data set having a number of resized data points less than the number of reduced data points;

A further aspect provided is a pixel module configured for using a predefined colour scale for assigning a unique colour of a plurality of colours to the combined value of the resized data point included in the display of pixels.

BRIEF DESCRIPTION OF THE DRAWINGS

These and other features will become more apparent in the following detailed description in which reference is made to the appended drawings wherein:

FIG. 5 is an example algorithm for rendering using data structure of FIG. 4;

DETAILED DESCRIPTION OF EMBODIMENTS OF THE INVENTION

Figure 11:
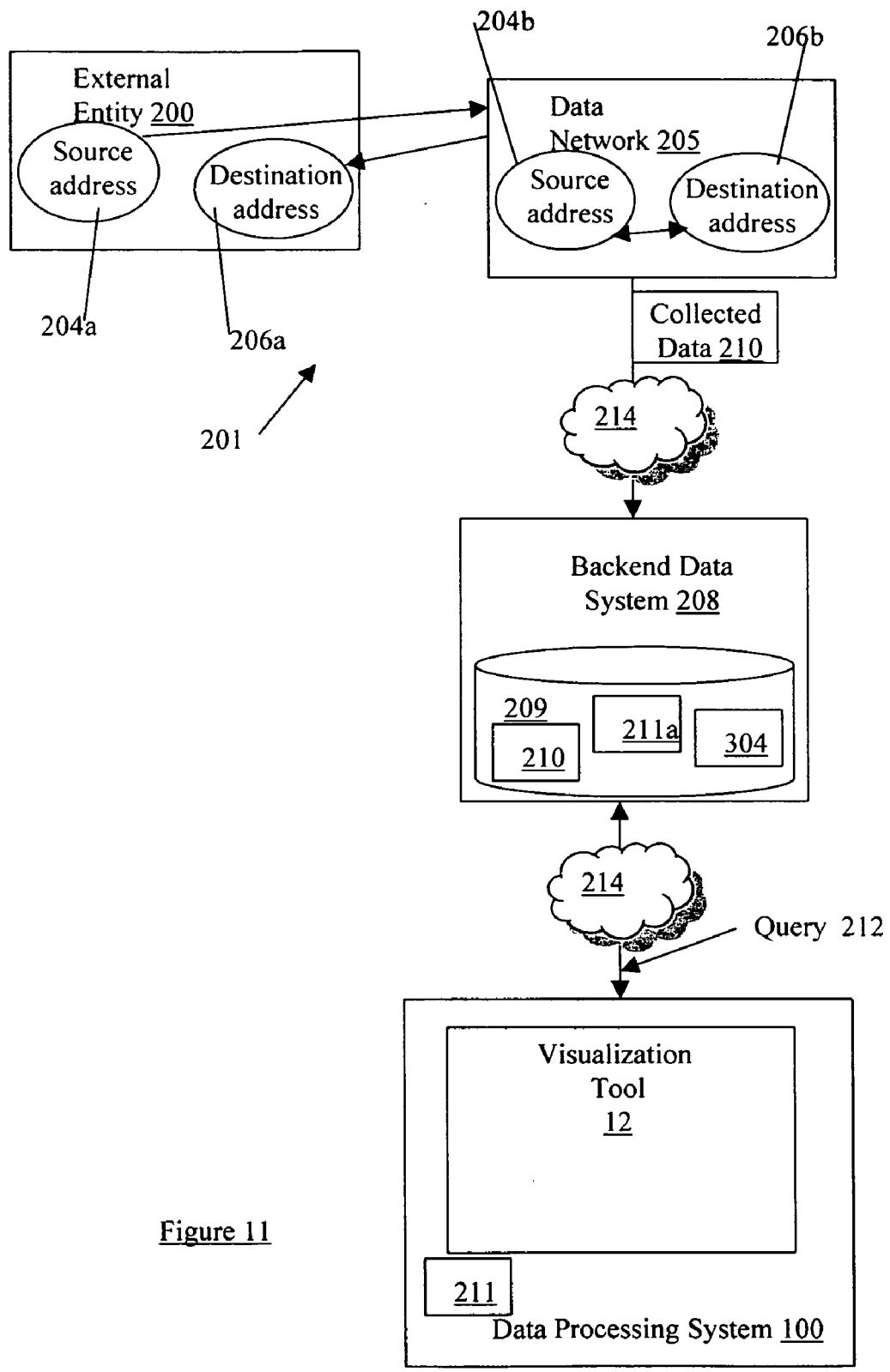
FIG. 11 shows an example environment for generating the data quantities of FIG. 1 with a data processing system and backend system for visualizing the data quantities.
Figure 12:
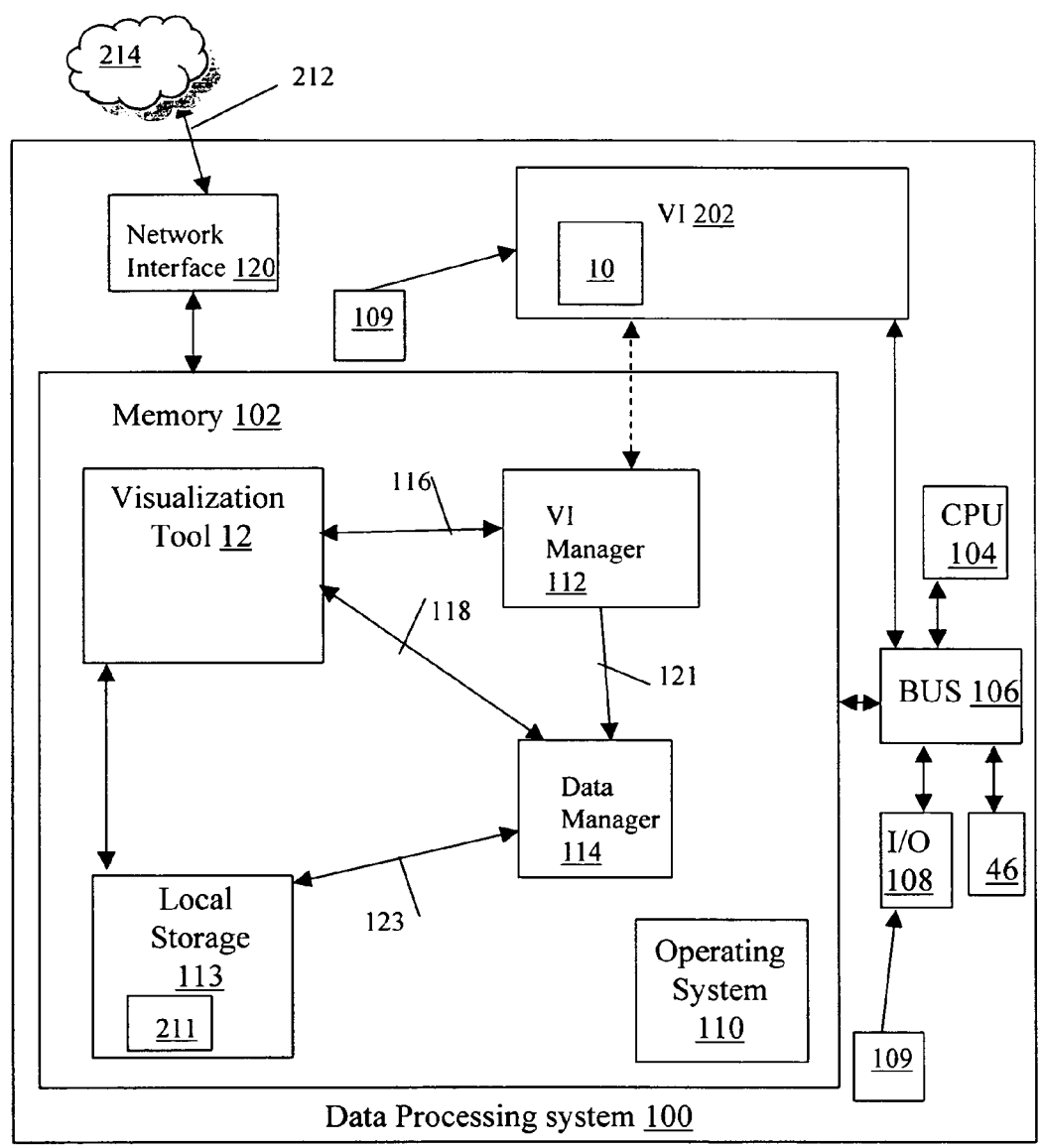
FIG. 12 is a further example of the processing system of FIG. 11.

Referring to FIGS. 11 and 12, a data processing system 100 (e.g. a computer that is a machine/device for manipulating data according to a list of instructions such as a program)

provides for visualized investigation of an original data set 210 collected over time, as displayed on a Visual Interface 202 of a visualization tool 12. The visualisation tool 12 generates an interactive visual representation 10 on the visual interface (VI) 202 containing selected characteristics of the collected original data set 210. The system 100 communicates via queries 212 over a network 214, for example, with a backend system 208, which stores the collected original data set 210 in a server storage 209. The original data set 210 can be stored both in raw format as well as in processed format, as further described below. The original data set 210 can include large data sets involving data correlated over multiple dimensions, including a temporal dimension as desired. For example, the collected original data set 210 can represent network data communications themselves (e.g. data packets) and communication patterns of the data communications over time (e.g. temporal relationships between data packets) of a data network 205. As an example environment 201 under analysis, an external entity 200 can be in communication with network 205 entities (not shown), represented as various source addresses 204b and destination addresses 206b, via respective destination addresses 204a and source addresses 204a, as further described below.

Referring to FIG. 12, the data processing system 100 for producing the visualization representation 10 of the environment 201 has the user interface 108 for interacting with the tool 12, the user interface 108 being connected to a memory 102 via a BUS 106. The interface 108 is coupled to a processor 104 via the BUS 106, to interact with user events 109 to monitor or otherwise instruct the operation of the tool 12 via an operating system 110. The user interface 108 can include one or more user input devices such as but not limited to a QWERTY keyboard, a keypad, a track wheel, a stylus, a mouse, and a microphone. The visual interface 202 is considered the user output device, such as but not limited to a computer screen display. If the screen is touch sensitive, then the display can also be used as the user input device as controlled by the processor 104. A network interface 120 provides for communication over the network 214 with the backend system 208 (see FIG. 11), if configured as to separate systems coupled by the network 214. Further, it is recognized that the data processing system 100 can include a computer readable storage medium 46 coupled to the processor 104 for providing instructions to the processor 104 and/or the tool 12. The computer readable medium 46 can include hardware and/or software such as, by way of example only, magnetic disks, magnetic tape, optically readable medium such as CD/DVD ROMS, and memory cards. In each case, the computer readable medium 46 may take the form of a small disk, floppy diskette, cassette, hard disk drive, solid-state memory card, or RAM provided in the memory 102. It should be noted that the above listed example computer readable mediums 46 can be used either alone or in combination.

Figure 13:
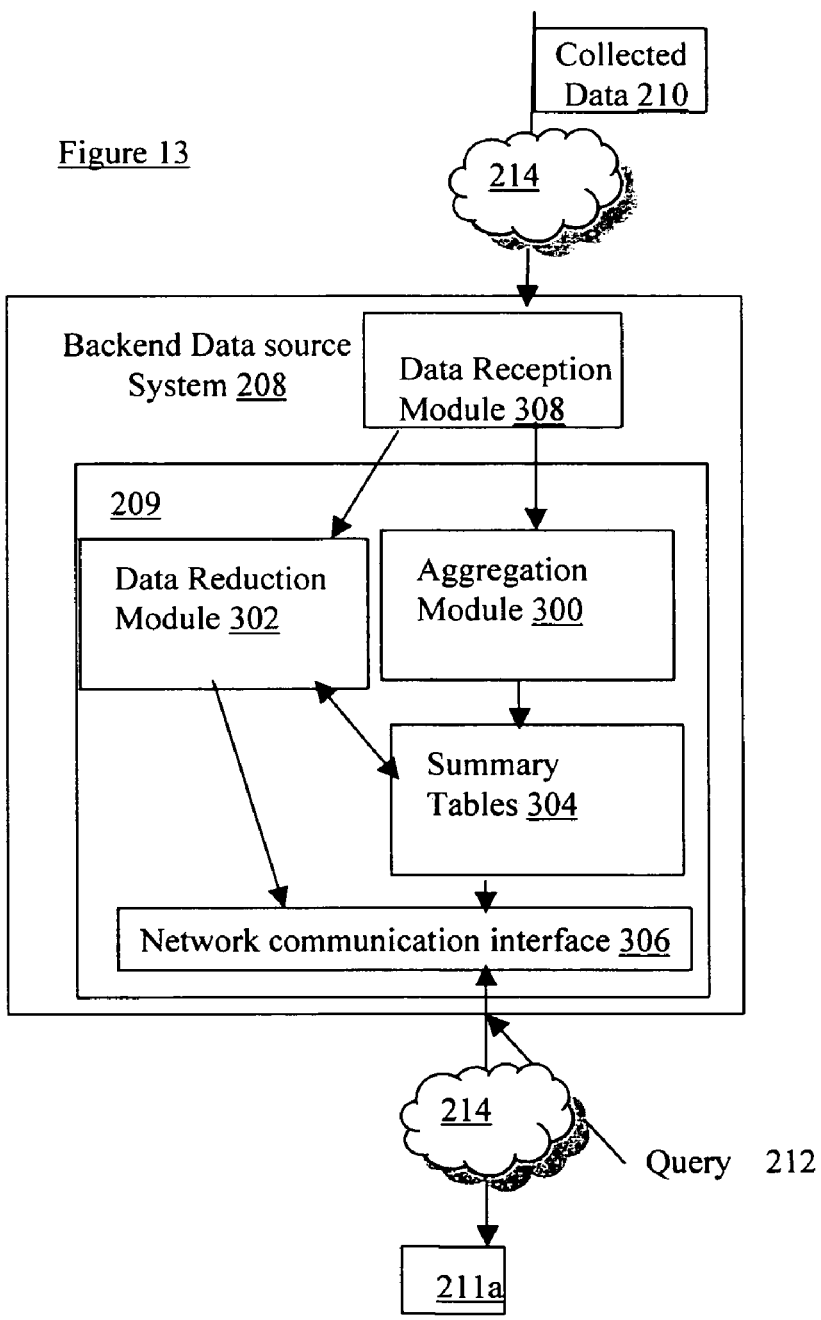
FIG. 13 is a further example of the backend system of FIG. 11.

Referring again to FIG. 12 and to FIG. 13, the tool 12 interacts via link 116 with a VI manager 112 (also known as a visualization renderer) of the system 100 for presenting the visual representation 10 on the visual interface 202, along with visual elements representing the visual characterization of the collected original data set 210. The tool 12 also interacts via link 118 with a data manager 114 of the system 100 to coordinate management of a requested reduced data set 211 (e.g. a subset of the processed data in the summary tables 304 available from the backend system 208) stored in a local memory 113. The summary tables 304 represent the original data set 210 at varying aggregated resolutions for subsequent processing by the data reduction module 302, as further described below. The data manager 114 can receive requests for storing, retrieving, amending, or creating the data content of the representation 10 via the tool 12 and/or directly via link 121 from the VI manager 112, as driven by the user events 109 and/or independent operation of the tool 12. Accordingly, the tool 12 and managers 112, 114 coordinate the processing of data content of the representation 10 and user events 109 with respect to the visual interface 202. It is recognised that the data manager 114 and/or VI manager 112 can be separate to, or part of, the tool 12 as configured in the memory 102.

Referring to FIG. 13, the backend system 208 has a data reception module 308 for receiving the collected original data set 210 from over the network 214. The storage 209 can contain a data reduction module 302 for dynamically reducing the amount of table data 304 sent as the reduced data set(s) 211a to the processing system 100 (e.g. a subset of the summary tables 304 content), and an aggregation module 300 for processing the original data set 210 to generate the summary tables 304 including temporal information of a count 144 (e.g. data packets—see FIG. 1) of the original data set 210, further described below. It is recognised that the reduction module 302 can operate on the data content of the summary tables 304 with regard to data visualization constraints of the VI 202, using data reduction techniques (e.g. compression of sparse data sets) that simultaneously retain key data set features of the original data set 210. For example, in network traffic data (e.g. original data set 210), there exists sparsely populated IP address data over time. Accordingly, the continuous dimension 140 of time is selected by the aggregation module 300 to provide for the most efficient/desired compression of the original data set 210 when constructing the tables 304. In the case of the network data, aggregation over time will result in the reduction of "zeros", i.e. lack of recorded network communications, resident in the original data set 210 for finer granularities of time. For example, having 60 data points in a one hour period, where only two of those data points each actually contain a recorded network communication, can be a good candidate to construct an "hour" table 304 having a corresponding aggregated data point signifying the two recorded network communications. Accordingly, it is recognised that appropriate non-continuous dimensions 142 can also be selected as the base dimension for constructing the tables 304 in situations where desired compression of sparse data will result, for example where the non-continuous dimension is a discrete quantity distributed fairly uniformly over a range.

The backend system 208 also has a communication interface 306 for transmitting the reduced data set(s) 211a to the client system 100 in response to the query 212 having a number of query parameters, as further described below. For example, in one embodiment, the query 212 would be a logical query (not one written in something like a SQL query language), such that the query 212 is first processed by the reduction module 302 which would run the actual SQL queries against the summary tables 304, and then return the results 211a to the vector module 406 which puts them into a data structure 454 that can be used by visualization tool 12 as the assimilated reduced data set 211, as further described below. Further, it is recognised that the backend system 208 could be implemented on the same data processing system 100 as the tool 12, as desired, including operations of the reduction module 302.

Figure 14:
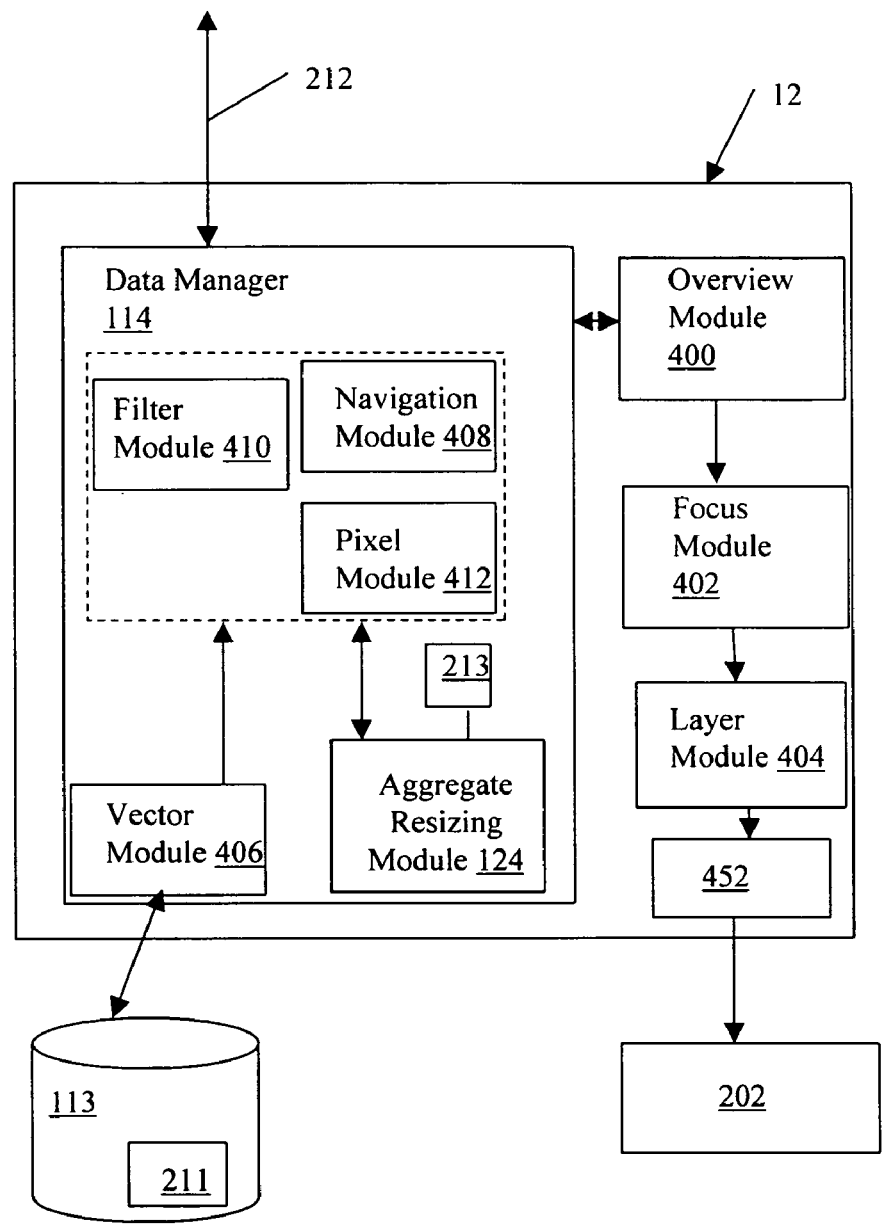
FIG. 14 is a further example of a visualization tool of the data processing system of FIG. 11.

Referring to FIG. 14, the tool 12 of the processing system 100 can have the data manager 114 and a plurality of modules 406,408,410,412, as further descried below, for further processing of the reduced data set(s) 211a received from the backend system 208 and further processing the assimilated reduced data set 211 (e.g. containing at least one data chunk 482 defined in a data space 480—see FIG. 4). It is recognised that the reduced data set 211 can be represented in a memory data structure 454 (e.g. data content of the reduced data set(s) 211a coupled to the data structure 454) as compared to the reduced data set(s) 211a which are represented in more of a tabular format representative of data retrieved from a database (e.g. tables 304). It is recognised that the reduced data set 211 can be in a more efficient form for manipulation by the resizing module 124 in constructing the bitmaps 452, in view of current computational capabilities of data rendering. It is recognised that future gains in computational capabilities of data rendering techniques may provide for on the fly use of the reduced data sets 211a directly in a more tabular format, thereby precluding the need to persist the reduced data set 211 in local storage 113.

Alternatively, the reduced data set 211 can be stored in local storage 113, and can be used in constructing the visualization representation 10 offline when not in communication with the backend system 208. The tool 12 also has such as but not limited to an overview module 400 for providing a contextual representation 10 on the VI 202 of the processed data set 211, a focus module 402 for selecting a temporal subset of the processed data set 211 as selected by the module 400, a layer module 404 for overlaying visual objects (e.g. alarm) over the displayed processed data set 211, and the aggregate resize module 124 for further dynamic aggregation on the reduced data set 211 from where the reduction module 302 left off.

The systems 100 and 208 introduce techniques for analysing massive amounts of data in the original data set 210 by the tool 12. The systems 100,208 can use image processing and data tiling techniques to allow the analyst to interact with the displayed data to help provide the visualization representation 10 that is responsive enough for real-time interaction with the massive original data set 210, as further discussed below. It should be recognised that the following discussion illustrates these techniques on the problem of analysing network traffic, by way of example only, and therefore original data sets 210 pertaining to other multidimensional data environments (not shown) having at least two or more dimensions can be used with the system 100, 208, as desired.

The systems 100, 208 can be adapted to meet the need of computer network security specialists for dealing with the massive amounts of data that are propagated through computer networks 205. The detection of network 205 intrusions and misuse by external entities 200 is a problem of identifying suspicious patterns in a plethora of the network original data set 210. This kind of recognition task is well suited to visualization: the human visual system is an unparalleled pattern recognition engine. The systems 100 and 208 allow the analyst to interactively explore an unprecedented amount of previously collected raw network data (e.g. the original data set 210). Through the integration of database summarization and image processing techniques, the systems 100 and 208 can display up to a month or more, for example, of network data for a reasonably sized network 205 on standard hardware. Having a visualization representation 10 of this nature available helps the analyst identify and examine, for example:

Low and slow scans—computer port scanning distributed over time to avoid detection by automatic systems;
Sources of ex-filtration—the covert transmission of data from within the network 205 to the attacker 200); and
Other unusual activity.

Because of the incredibly large amount of data in the original data set 210 produced by monitoring a computer network 205, prior art systems in use today for network intrusion forensics usually forgo in-depth visualization, instead representing text tabulations of packets. With an average packet size of 500 B, a T1 network running at 25% capacity for 24 hours will produce approximately 8 million packets. This is more than most network visualizations can handle while maintaining responsiveness. The systems 100 and 208 have been used with original data sets 210 of over 50 million packets and are designed to be usable for 1 month worth of data from a typical T1 network, for example.

The technical innovations used by the systems 100 and 208 to allow representation and interaction with such large amounts of data of the original data set 210 include techniques such as but not limited to:

Tiled vector graphics with multi-dimensional aggregate cubes;
Aggregate resizing with joint linear-log colour scale; and/or
Fuzzy interactions and fat pixels, as further described below.

Data Collection and Summarization

It is recognised that functionality of the backend system 208 and the data processing system 100 can be implemented as shown (in FIGS. 13 and 14) or can be reconfigured as desired (e.g. modules 300, 302, 304, 308 and modules 406, 408, 410, 412, 124 can be placed in selected combinations in any of the systems 100, 208). For the purposes of demonstration only, the following discussion of pre-processing the original data set 210 is made with reference to the backend system 208 and the aggregate resizing processing of the reduced data set 211 is made with reference to the processing system 100.

In general, the systems 100,208 can provide an aggregate reducing and resizing methods that combines logical and image operations to create an effective image zooming function based on pixelation that can help avoid time consuming database system 208 lookups.

Pre-processing of Original Data Set 210

Figure 15:
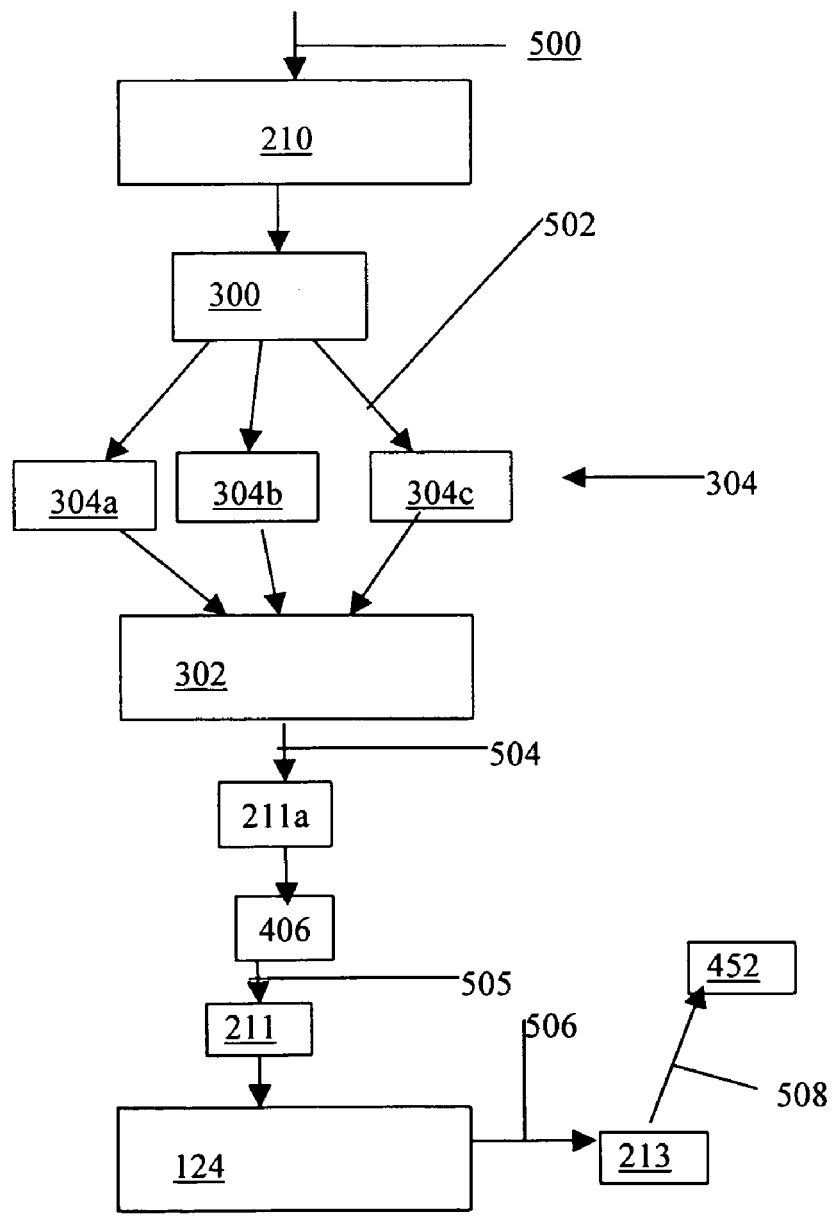
FIG. 15 is an example operation of the systems of FIG. 11.

Referring to FIGS. 13 and 15, the original data set 210 collected from the environment 201 (under analysis) is processed upon entry into the backend system 208 in order to provide a first stage of data optimization that facilitates handling of large amounts of data with respect to the processing capabilities for configuration and display of the visual representation 10. This first stage data optimization takes the form of creating multiple level-of-detail tables 304 that each aggregate the original data set 210 on a different scale of a selected dimension (or dimensions) and aggregation criteria (for example packet count 144 for scale time periods/intervals such as day, hour, etc). One example would be to aggregate a count 144 (e.g. for network packets—see FIG. 1) contained in the original data set 210 in intervals of hours, minutes and seconds, thus generating three individual tables 304a,b,c by the module 300 with different temporal levels of resolution. It is recognised that the temporally dependent packet count 144 content of the tables 304a,b,c also includes the further dimensions of, for example, source and destination IP addresses, port numbers, etc., as desired. Accordingly, the pre-processed data is stored in the predefined number of tables 304a,b,c and the raw original data set 210 can also be maintained (e.g. as a table 304 itself, for example) to allow the analyst (user of the processing system 100) access to the highest resolution level of environment 201 details possible when that is required during analysis.

Referring to FIGS. 11, 13 and 15, initially, the original data set 210 is read at step 500 into the data reception module 308, e.g. raw traffic and alarm data collected from the environment 201 are read into the storage 209 (e.g. a SQL server database) from formatted, delimited text files based on the log files produced by standard network capturing tools (not shown). This original data set 210 can include multiple dimensions such as but not limited to fields/columns for time, source IP, destination IP, source port, destination port, protocol, sensor, and packet size, where it is recognised in the present example that the dimension of time represents the continuous dimension 140 (see FIG. 1) and each of the other fields/columns represent the discontinuous or discrete dimensions 142. For alarm data, the corresponding entries may not include size but instead can indicate the severity of the alarm.

Figure 1:
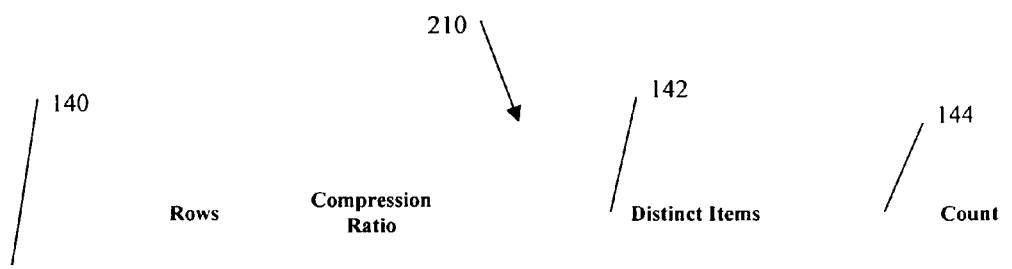
FIG. 1 shows example network data statistics found for 33 days worth of network traffic collected from a moderately busy network.

At step 502, the data in the raw original data set 210 is processed by the aggregate module 300 to produce the aggregation content of the tables 304 containing the count 144 on the continuous dimension 140 of time for predefined temporal granularities for selected discrete dimensions 142, as given above and in FIG. 1 by way of example only. For example, the tables 304 can be used to store the number of packets (similar to count 144) accumulated from each unique combination of source and destination IP's and ports (e.g. addresses 204a,b and 206a,b—see FIG. 11). The summary tables 304 can be defined at the hundredth second, second, minute and hour resolutions, for example, or for other temporal granularities as befits the data characteristics for the environment 201 under analysis. In general, this construction of one or more tables 304 provides for various levels of data compression for sparsely populated data sets, e.g. empty data points of the original data set 210 are combined to provide for a summarized data set (i.e. the tables 304) for use in subsequent queries 212 from the processing system 100. It is recognised that the reduction module 302 can use the existence of multiple table 304 (of various compression levels) to match the best compression level available to the parameters of the query 212.

As further discussed below, subsequent use of these tables 304 by the data reduction module 302 at step 504 can reduce the query time of the query 212 originating from the system 100, for example when the processing system 100 is requesting packet data at a temporal resolution near a table's 304 time granularity as shown on the visualization representation 10. Furthermore, summary visual representations 10 of the processed data that do not include time (continuous dimension 140) as a dimension can be generated from queries 212 on the hour table 304, taking advantage of the maximum level of time compression (e.g. of the continuous dimension 140) of the tables 304 and the work already done in pre-processing to generate the hour table 304 (e.g. the table 304 of minimum resolution—i.e. highest level of data aggregation already available).

Summarizing the original data set 210 in the above described use of tables 304 of varying granularity can improve the turn-around time for the queries 212 and can make using the tool 12 a more interactive experience for the analyst. These improvements can be characterized by the example temporal compression ratios achieved and reported in dimension 140, see FIG. 1 by way of example only. This compression is due to the high rate of duplication of data points over the continuous temporal dimension 140. The cost for these improvements is in the additional disk space used in the storage 209. To illustrate the compression we achieve by summarizing the data in this way and the cost in storage requirements, we captured packet data on our local network 205 as shown in FIG. 1. This data corresponds to approximately 33 days of the original data set 210 from the network 205 of approximately T1 capacity. We captured about 50 million packets (e.g. the original data set 210) which correspond to a log file size of approximately 3 GB. The log file was loaded into the module 308 of the backend system 208 and pre-processed. The final outcome was a processed data in the tables 304 of approximately 8 GB, including the raw traffic table 304 of varying levels of aggregation as outlined.

Further aggregating is done along the discrete dimensions 142, for example, by module 302 at step 504, to generate the results 211a in response to result size 1limits set by query 212. These constraints take into account the pixel display constraints of the VI 202. This aggregate resizing is referred to as "binning" and is further described below.

Aggregate Resizing Using Database Parameters (e.g. SQL)

In network forensics, special methods must be used to accommodate very large amounts of data in order to preserve the analyst's ability to interact dynamically with the analysis. The first approach developed for the systems 100,208 is to pre-process the original data set 210 into aggregate tables 304 via the module 300 at step 502 (see FIG. 15) described above. Second, the data reduction module 302 is used to retrieve dynamically binned subsets of the original data set 210 as the reduced data set(s) 211a, by interpreting the logical query 212 and using the resultant SQL (e.g. database) queries 212 on the storage 209 at step 504.

Example of a Logical Query 212

First of all this example query 212 describes the constraints on what the analyst would like to view in terms of a continuous volume of the range of values covered by the packet data:

Time range (10:00:00 am Mar. 03, 2006 to 10:00:00 am Feb. 03, 2006);

Source IP range (0.0.0.0 to 255.255.255.255—all source IP's);

Source port range (0 to 65536=all source ports);

Destination IP range (192.168.0.1 to 192.168.255.255=all local network addresses);

Destination port range (0 to 1024=most well-known access ports);

Sensor (1=specify the system that recorded the packets); and

Protocol types (TCP and UDP=common internet traffic packet protocols).

Secondly, this query 212 specifies the amount and type of the result set:

Maximum number of bins (4096×122880=highest zoom level of a context view 472 if 1 bin=1 pixel), thereby recognizing that the display of pixels (i.e. the bitmap 452) can also be ordered into 1 bin=a group of pixels; and Aggregate value (count=number of packets, versus size which would aggregate the number of bytes in each packet).

Example of a Data Base Query 212 Used by Module 302

The data reduction module 302 can use a number of SQL queries 212 to construct the result set that will be returned to the data manager 114. The following examples were taken from generating a focus view 472 of Source Port versus time with no restrictions except for a time range between Jan. 30 and Feb. 2, 2004. These times have been converted to number format and rounded to the nearest minute (1075107600.0 and 1075323600.0 respectively). The results will be retrieved and aggregated at the minute level.

Example Source Port Bin Assignment SQL:

--- declare @binMultiplier float, @binDenominator int
select @binDenominator=count(distinct SrcPort)
    from TrafficMin tt
    where tt.TrafficTime between 1075107600.0 and 1075323600.0
//Determine the number of ports per bin (binMultiplier)

```
// - at most 4096 bins.
if @binDenominator > 0
    begin
        select @binMultiplier=4095.0/@binDenominator
    end
else
    begin
        select @binMultiplier=0
    end
declare @sql nvarchar(1000)
//Create the temporary table either with one value per bin (first
//case) or calculated bin for values (when more than one value //per
bin)
if @binMultiplier > 1 or @binMultiplier = 0
    begin
        select    @sql    =    'create    table
            TEMP_A101C41ED1534D17845BFC9E191F5A48
            (id int identity(1,1), SrcPort int, bin as id)'
    end
else
    begin
        select    @sql    =    'create    table
            TEMP_A101C41ED1534D17845BFC9E191F5A48 (id   int
            identity(1,1), SrcPort int, bin as cast (cast(id as float)*'
            + cast(@binMultiplier as nvarchar) + ' as int))'
    end
execute sp_executesql @sql
//Populate the temporary table - this will calculate bins at the //same
time.
insert into TEMP_A101C41ED1534D17845BFC9E191F5A48 (SrcPort)
select distinct SrcPort
    from TrafficMin tt
    where tt.TrafficTime between 1075107600.0 and 1075323600.0
    order by SrcPort
create index IX_temp on
TEMP_A101C41ED1534D17845BFC9E191F5A48 (SrcPort)
```

Example Results Set Generation SQL:

```
//Generate the result set by quering for the traffic and joining //on
the temporary table. This is what will be returned to the //datamanager
select bin1.bin, bin2.bin, sum(hits),
    from TrafficMin tt
    join TEMP_A101C41ED1534D17845BFC9E191F5A48 bin1
        with (index (IX_temp)) on bin1.SrcPort = tt.SrcPort
    join TEMP_527D4A2763254E48AC0E9689F0184A45 bin2
        with (index (IX_temp)) on bin2.TrafficTime = tt.TrafficTime
    where
    tt.TrafficTime between 1075107600.0 and 1075323600.0
    and bin2.bin between 0 and 4095
    and bin1.bin between 0 and 4095
group by bin1.bin, bin2.bin
order by bin1.bin, bin2.bin
```

In calculation of the reduced data set(s) 211a, it is recognised that there are a number of options, such as but not limited to:

1. you can specify or calculate the summary table 304 to use, where it is conceivable that in another scenario there would be more than one continuous dimension 140 such that both of the continuous dimensions 140 would have individual summary tables 304 for use;
2. you can have a mixed continuous 140 and non-continuous 142 dimensions case, such that a non-continuous dimension 142 will be binned according to the data in the appropriate summary table 304 (representing data correlated implicitly with the continuous data 140; and
3. neither dimension(s) is continuous, such that one could use the smallest (most aggregated for example) summary table 304 to do the binning on the two non-continuous dimensions 142 of interest.

For use in generation of the visualization representations 10 based on some content portion of a selected table(s) 304, ultimately we need to know the number of pixels 450 that will be rendered on the VI 202. The first step the tool 12 takes to determine this is the query 212. The database 209 can hold the raw packet information that will be retrieved by the tool 12 of the processing system 100, in order to be processed and displayed to the analyst as the visualization representation 10. At this communication boundary between the backend system 208 and the processing system 100, the quantity of data can pose two major problems. First, since retrieving the reduced data set 211a from the backend system 208 and transmitting it to the processing system 100 may take a long time, we would like to retrieve only as much of the total data set 210 or 304 as we need. This is partially accomplished by using the appropriate time aggregate table 304 (produced in step 502) depending on the amount of time the analyst would like to examine and at what level of detail. The second problem is that without a measure of control over how much data is returned by the query 212, the processing system 100 could easily use up all available local memory 113 on the client machine and become unresponsive or crash. To help avoid this, data reduction by the module 302 preferably should occur on the server system 208 side to as great a degree as possible, as further described below. The data reduction or binning process acts to aggregate on the other dimensions 142 (see FIG. 1) present in the selected table 304.

The backend system 208 incorporates a method of dynamic binning by the module 302 to specify and limit the size of the reduced data set 211a retrieved. This mathematical procedure can be done for data along the time 140 axis, since this quantity is continuous. However, dimensions specifying port and IP do not possess the same uniformity that time enjoys. In particular, if we were to uniformly scale the space of all possible IP addresses, then large gaps could appear along the dimension 142 when the actual data were rendered. In the case of time, gaps indicate periods of inactivity, for IP's, gaps only indicate addresses that were not visited. For ports, a uniform scaling of the full range of 65,000 values, for example, would equally compress the differences among the less meaningful upper range of values as the very meaningful values below 1024: determining the difference between web activity on port #80 and ftp activity on port #21 can be more informative, in the general case, than discerning activity on ports #62,000 and #62,059, by example.

The dynamic binning by the module 302 can occur at the database system 208 level. When the system 100 places a request for data it specifies in the query the range of interest, as per usual, but it also specifies the maximum size of the eventual bitmap 452 it can represent. Each pixel 450 in the eventual bitmap 452 is considered a bin, such that the module 302 logic is responsible for determining the values (i.e. aggregated count 144) that belong in each bin. This can be calculated separately for both dimensions of the bitmap 452. For time dimension 40, the calculation is mathematical, independent of the data in the reduced data set(s) 211a. This is because the time dimension 140 is represented as continuous and can be uniformly scaled. For other dimensions 142, the process is more involved. First the number of distinct values that fall in the requested range is discovered. Using this information a temporary table is built, each record in the table maps one value from the dimension to a bin number. The bin numbers are calculated during insertion to the temporary table as a function on the row number, such as but not limited to:

$$\text{bin} = \text{row} \frac{\|\text{bins}\|}{\|\text{distinct values}\|}.$$

Finally, the data table 304 is queried for the values in range to return and using a join to the temporary bin table to retrieve the bin number. This query (for example an SQL query as given above) 212 aggregates on the bin number values of the joined table 304 in order to produce the reduced data set 211a. This procedure helps that the backend system 208 does not return more data of the reduced data set 211a than a constant factor of the area of the bitmap 452 (e.g. predefined threshold of the number of available pixels or groups of pixels that are to be used in generating the bitmap 452). For example, the database may be tasked to return a dataset containing a range of 2000 distinct source IP's whose packet counts are aggregated over seconds. If the requested maximum size for the source IP by time virtual bitmap 452 is 1024 by 1024 pixels, then a temporary table constructed by 302 will associate 1.9 IP's with each of the 1024 row bins, on average, and the data query will return 1024 second columns from the second summary table 304, for a total of about 17 minutes.

Once received by the system 100, the vector module 406 at step 505 will accumulate and interpret the results in order to convert them to the assimilated reduced data set 211 in a memory format suitable for use by the various components of the system 100 in generating the rendered bitmap 452, as the visualization representation 10. This process is further described below.

Aggregate Resizing Using Pixelation Parameters

Figure 8:
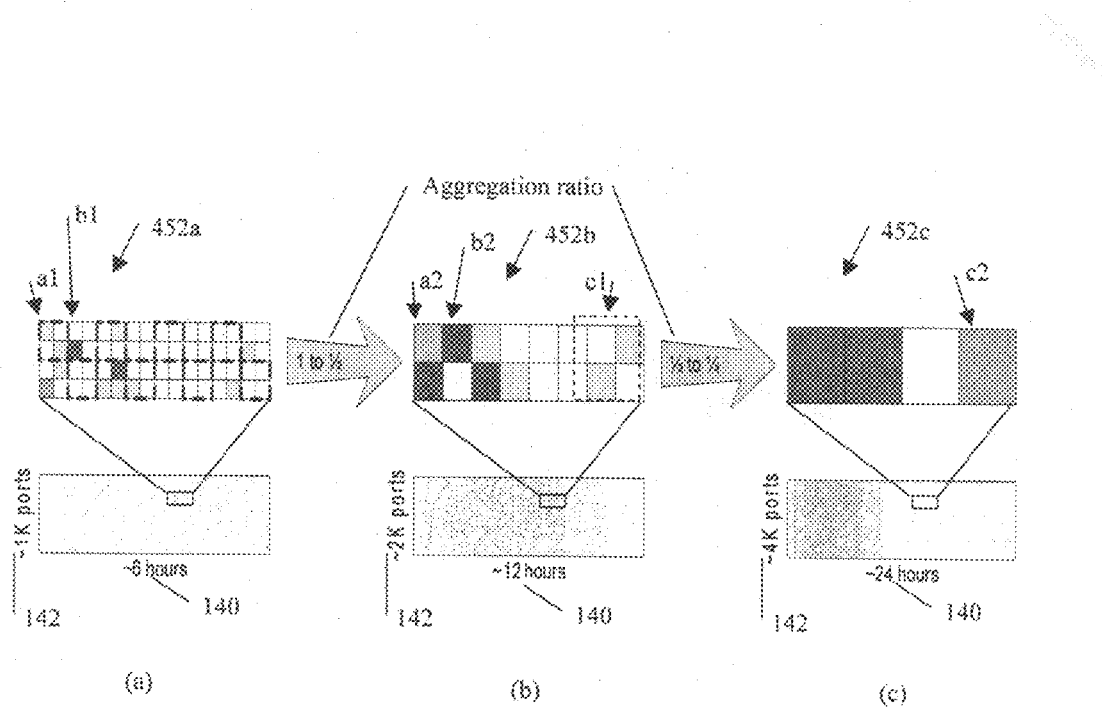
FIGS. 8a,b,c are example operations for aggregation of the original data set of FIG. 11.

Further aggregate resizing at step 506 is shown by example in FIG. 8, which is done on the fly with the subset of data (the reduced data set 211) via the module 406. The provision of operation on the reduced data set 211 takes into account pixel display constraints of the VI 202, i.e. pixelation levels, as further described below.

With the reduced data set 211 in hand in the data manager 114 via the local storage 113 (see FIG. 12), the tool 12 uses a number of methods that mimic the performance of image processing operations on logical data. The first technique takes advantage of the sparse nature of original data set 210 by using a vector representation as the data structure 454 (see FIG. 4) instead of an array or bitmap representation, to assist in the summation based on the pixelation level specified. Second, the tool 12 retains the high dimensionality of the original data points (e.g. data stored in a pixel record buffer 462 to contain information on the data points for axes not rendered to the bitmap 452—i.e. those individual data points summed in the resizing operation of the module 124) to help perform approximate highlighting and filtering, as further described below. It is recognised that the term "summing" refers to combining the values of adjacent data points in reduced data set 211 so as to represent all desired available information of the adjacent points in the combined value assigned to a representative resized data point. One example of this is to additively combine all the adjacent values, with or without applied weighting. On the contrary, in mathematics, there are numerous methods for calculating the average or central tendency (median/mode) of a list of n numbers. This is not the same as combining done on adjacent data points described above in the processing system 100 to get a representative count 144 of the data (e.g. packets). For example, the "average" of packet counts 1,1,1,1 would provide a value of 1, while a combination of the packet counts of 1,1,1,1 would provide a combined value of 4 (representing a total of packet counts 144 for example).

Output of the reduced data set 211 contents in the visual representation 10 is done as a bitmap 452 (see FIG. 4), such that each pixel 450 of the bitmap 452 represents a certain count 144 for a selected discrete dimension 142 (see FIG. 1). It is recognised that in general for generic original data sets 210, different discrete dimension(s) 142 can be selected to provide the count 144 eventually represented by each pixel 450 of the resultant bitmap 452 (see FIG. 4), further described below. For example, a shading and/or colour scale 456 (see FIG. 10) can be used as a visual indicator of the magnitude of the count 144 represented by each pixel 450 displayed in the bitmap 452 of the visualization representation 10. The production of a resized data set 213 from the reduced data set 211 is based on a pixelation level specified by the tool 12 for use in formulating the resultant context 470 or focus 472 view(s) for display on the VI 202 (as the resultant bitmap 452). The production of the resized data set 213 is done using data manipulation considerations as compared to the production of the reduced data set 211, which is done using data retrieval considerations. It is recognised that the generation of the data sets 211, 213 could be done by a single module (not shown), resident on the processing system 100, in response to a desired context 470 or focus 472 view given suitable processing power database network retrieval considerations.

Further, it is recognised that the resized data set 213 can be a temporary abstract construct that is produced during the rendering process (i.e. dynamic) through interactions between the managers 112,114 in response to a desired view 470,472 specified by the user of the tool 12. Further, it is recognised that the resultant bitmap 452 is coloured (or otherwise appropriately shaded) on a pixel-by-pixel basis following a scheme of the scale 456. As such, it is recognised that the resized data set 213 may not be persisted during rendering of the bitmap 452, and instead is done as an inline process in rendering pertinent parts of the reduced data set 211 in construction of the bitmap 452. In this case, the state information of the resized data set 213 is retained by the VI manager 214 for use in navigating between the data details of the reduced data set 211 and the resized data set 213 (to account for the pixelation differences between the data content of the reduced data set 211 and the decreased resolution level of the resized bitmap 452). This state information of the resized data set 213 can include such as but not limited to pixelation (e.g. pixel summation details—see FIG. 8), filter details, and/or pixel highlighting details as further discussed below.

Figure 10:
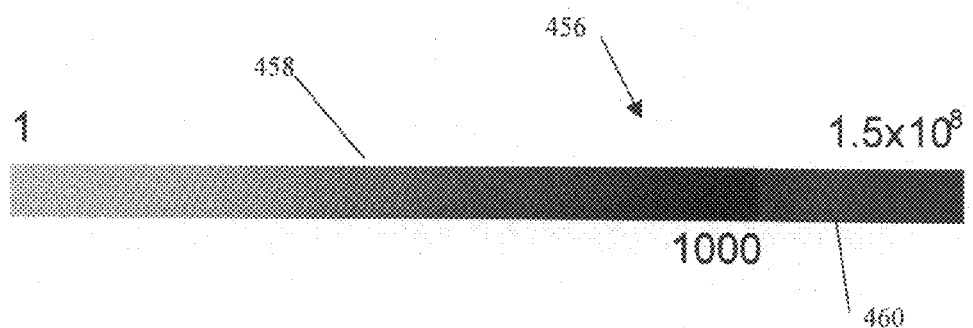
FIG. 10 is an example scale for representing count of the pixels of FIG. 4.

Referring to FIG. 10, the default linear-log colour scale 456, for example, shows corresponding values for displaying packet count 144 data. The colour scale 456 can be applied by the processing system 100 (by pixel module 412—see FIG. 14) when displaying the corresponding count 144 in each pixel 450 (or representative group of pixels 450 if desired) in the visualization representation 10, e.g. a count 144 of say 100 packets would receive a pixel colour of light blue as dictated by the colour scale 456. Further, colours of the pixels 450 can be based on either the number of packets (i.e. count 144) that the data point/pixel represents or the total amount of data in bytes that the point/pixel represents, for example. In either case there can be a large range of possible numbers. The systems 100, 208 can use the linear-log colour scale 456 when mapping values (i.e. count 144) to pixel colour to increase the ease with which heavy traffic areas can be identified in the visualization representation 10 and to help accommodate a large range of count 144 values. The colour scale 456 can be defined by a linear segment 458 followed by a logarithmic segment 460. The mapping from values to colour is continuous, but the rate of change between values that map to consecutive colours on the scale 456 is linear in the first segment 458 and exponential in the second segment 460. The change from linear to logarithmic can be accompanied by an obvious hue change. This colour scale 456 can facilitate retention of most of the information for discerning count 144 values at the lower end of the scale 456 and clearly highlight areas that are hot with activity so that they can be picked out immediately from a quick scan of the pixels 450 of the bitmap 452 shown in the visualization representation 10.

A pixel 450 is one of the many tiny dots that make up the representation of a picture in a computer's memory. Each such information element is not really a dot, nor a square, but an abstract sample. With care, pixels 450 in an image (e.g. bitmap 452) can be reproduced at any size without the appearance of visible dots or squares; but in many contexts, they are reproduced as dots or squares and can be visibly distinct when not fine enough. The intensity/colour of each pixel 450 is variable; in colour systems, each pixel 450 has typically three or four dimensions of variability such and Red, Green and Blue, or Cyan, Magenta, Yellow and Black that are combined to make up each of the representative colours in the scale 456. A pixel 450 is generally thought of as the smallest complete sample of an image (e.g. bitmap 452). The definition of the "smallest" is highly context sensitive depending upon the visual features of the data being represented by the pixels 450.

Referring to FIGS. 4, 8, 13 and 15, aggregate resizing and sample results are shown as the reduced data set 211 is operated on at step 506 by the module 124 for use in creation of the bitmaps 452a, 452b, and 452c represented by the resized data set 213. It should be noted that bitmap 452a can represent the visual display of the reduced data set 211 obtained (in step 504) from the tables 304, i.e. no aggregate resizing is performed as the resolution level implicit in the reduced data set 211 satisfies display parameters of the VI 202, as specified by the tool 12 in generating the context 470 and/or focus 472 views (see FIGS. 2 and 3) further described below.

If the resolution level of the reduced data set 211 is greater than the display capabilities for the requested context 470 or focus 472 view, then the resize module 124 uses the count 144 data from the reduced data set 211, represented in sample bitmap 452a, to create the reduced display resolution of bitmap 452b as represented by the resized data set 213. It should be recognized that the count 144 contained in the reduced data set 211 is implicitly captured in the count 144 contained in the resized data set 213, since a reduction in the number of data points in the resized data set 213 maintains the actual count 144 that was present in the reduced data set 211. For example, if a count 144 of two packets is in a first data point and a count 144 of three packets is in an adjacent second data point of the reduced data set 211, then when the first and second data points are combined by the module 124, their respective counts 144 are summed to give the count 144 of five packets in the resized data set 213. In this summation, it is recognised that the colour that will be assigned to the pixel 450 representing the five packets can follow the colour scale 456, as does the colour assigned to each of the pixels 450 representing the original two packets and three packets of the first and second data points respectively. This consistent application of the scale 456 between data sets 211,213 provides for contextual reference to the analyst when analyzing the data from the environment 201.

Aggregate resize and pixelation level is such that pixelation level can be the square root of the ratio of displayed pixels 450 to data points. In other words, the module 124 renders the data space of the reduced data set 211 so that a two by two square of four data space pixels 450, for example, represents a single screen pixel 450 (aggregation ratio of 1:4) to give a pixelation level of one half. Instead of a typical image reduction algorithm of the prior art that would fade isolated pixels, the module 124 instead resizes the aggregation of the data in the reduced data set 211 by summing the counts 144 of the two by two square of pixels, in order to generate a new set of values in the resized data set 213 (for example a total count 144) for use in generation of the bitmap 452b. In this example, the four data points representing four distinct counts 144, are represented by a single consolidated pixel 450 (of the bitmap 452b) showing the sum total count 144 of the four points. Furthermore the aggregate resized pixel 450 can represent a union of ranges of non-visible dimensions for all four data points. This pixelation level corresponds to a zoom factor of 50% relative to the data space between the two bitmaps 452a,b (bitmap 452b would appear to be one half the size, one quarter the area, for the same data assuming the two bitmaps 452a and 452b were displayed side by side on VIs 202 of the same display capabilities and screen resolution pixel levels).

FIG. 8c shows the same operation of the module 124 but for a pixelation level of one quarter, reducing a set of 16 adjacent data points of the reduced data set 213 for the bitmap 452b from a four by four square into a single consolidated pixel 450 of the resultant bitmap 452c. This can help to preserve all the information (e.g. packet count 144) of the reduced data set 211 implicitly represented in the bitmaps 452a,b,c, though a reduced resolution level of the information will be visible at a time on the VI 202 (see FIG. 12). The system 100 uses aggregate resizing by the resizing module 124 to preserve as much information of the original data set 210 as possible (represented on the system 100 by the reduced data set 211). It is recognized that the module 124 can produce the resized data set 213 representing a zoom level directly from bitmap 452a to bitmap 452c, thereby skipping bitmap 452b as desired.

Accordingly, resizing the bitmaps 452a,b,c for pixelation levels greater than one is a simple linear image stretching operation. One data point can be rendered to a two by two square of bitmap pixels for a pixelation level of two, which corresponds to a zoom factor of 200%, with no lose of information, as the colour scale 456 is applied consistently across the various bitmaps 452a,b,c. The bitmap, in this example, would appear twice as large with four times the area, when displayed side by side on VIs 202 of the same display capabilities and screen resolution pixel levels.

It is recognised that pixel aggregation other than as described above can be used, for example pixelation between bitmaps 452a,b,c can be any desired aggregation granularity such as but not limited to aggregation ratios of 3:1, 4:1, 5:1, 6:1, 7:1, 8:1, 16:1 and others as desired. Further, it is recognised that aggregation resizing can be implemented on a row by row or column by column basis. For example, three adjacent pixels 450 in one row can be aggregated into one resultant pixel 450 in the same row of the corresponding aggregated bitmap 452, thus useful in adjusting the aspect ratio of the aggregated bitmap 452 with respect to the original bitmap 452 (i.e. the aggregated bitmap has the same number of columns but a reduced number of rows according to the used aggregation ratio). A similar technique can be used to reduce the number of rows while maintaining the number of columns, or both the rows and columns can be adjusted simultaneously using dissimilar aggregation ratios for the columns and rows respectively.

Accordingly, as described above, aggregate resizing can reduce the number of screen pixels 450 to draw by mapping neighbouring data space pixels 450 to a single screen pixel 450 (or reduced number of pixels 450) that represents the sum of those counts 144 of the pre-aggregation data points. The number of pixels 450 that are summed can depend on the pixelation level. To effectively zoom out the data space by a factor of two, the pixelation level of one half is used. To resize the virtual bitmap 452, the data space is partitioned into a grid of two by two pixel 450 squares each, the count 144 value in each of these is summed and drawn as a single screen pixel 452 value. As a result, a single isolated pixel 450 can be represented in exactly the same way, but some of its surrounding empty pixels 450 can be removed.

Referring again to FIGS. 8a,b, it is recognised that pixel set a1 of bitmap 452a with two empty pixels (depicted as white on the scale 456) and two moderate count pixels (depicted as a light shade of grey on the scale 456) is aggregated as pixel a2 of bitmap 452b, such that the colour of pixel a2 follows the colour scheme of the colour scale 456 (see FIG. 10) for the resultant summed count 144 (depicted as slightly darker shade of grey of the scale 456) of the two moderate count pixels of pixel set a1. Similarly, pixel set b1 of bitmap 452a with one heavy count pixel (depicted as black of the scale 456) and three empty pixels is aggregated as one pixel b2 of heavy count (also depicted as black of the scale 456) of bitmap 452b, where it is recognised that the colour of the one heavy count pixel of pixel set b1 and the colour of the one aggregated pixel b2 is the same due (i.e. black of the scale 456) to the same count 144 represented. Further, referring to FIGS. 8b,c, pixel set c1 of bitmap 452b is aggregated as one pixel c2 with the corresponding summed count 144 resulting in the increase in shading of the pixel c2 according to the colour scale 456.

It is recognised that aggregate resizing of the count 144 represented by the pixels 450 of the bitmaps 452 helps to avoid loss of information that could occur if any interpolating image resizing algorithm were used. Instead this method of the module 124 operates on the logical data to summarize it upon rendering. This aggregation resizing method of bitmap pixels 450 removes the white space between data points instead of the data points themselves by preserving data instead of colour. Another benefit of this technique can be that certain features in the data, such as lines and areas of dense traffic, can become more salient as the analyst zooms out through successive display of the bitmaps 452a,b,c of varying temporal granularity. This can be useful in the initial exploration of the data 210. We will see how this comes into play for some typical forensic tasks later wherein exploring the visualization representation 10, the analyst may want to zoom in and out of a data space to find overarching patterns and more detailed goings-on using the appropriate level of detail table 304 and resulting bitmap 452 according to the query 212 parameters and resolution capabilities of the display 202, as further described below.

Figure 4:
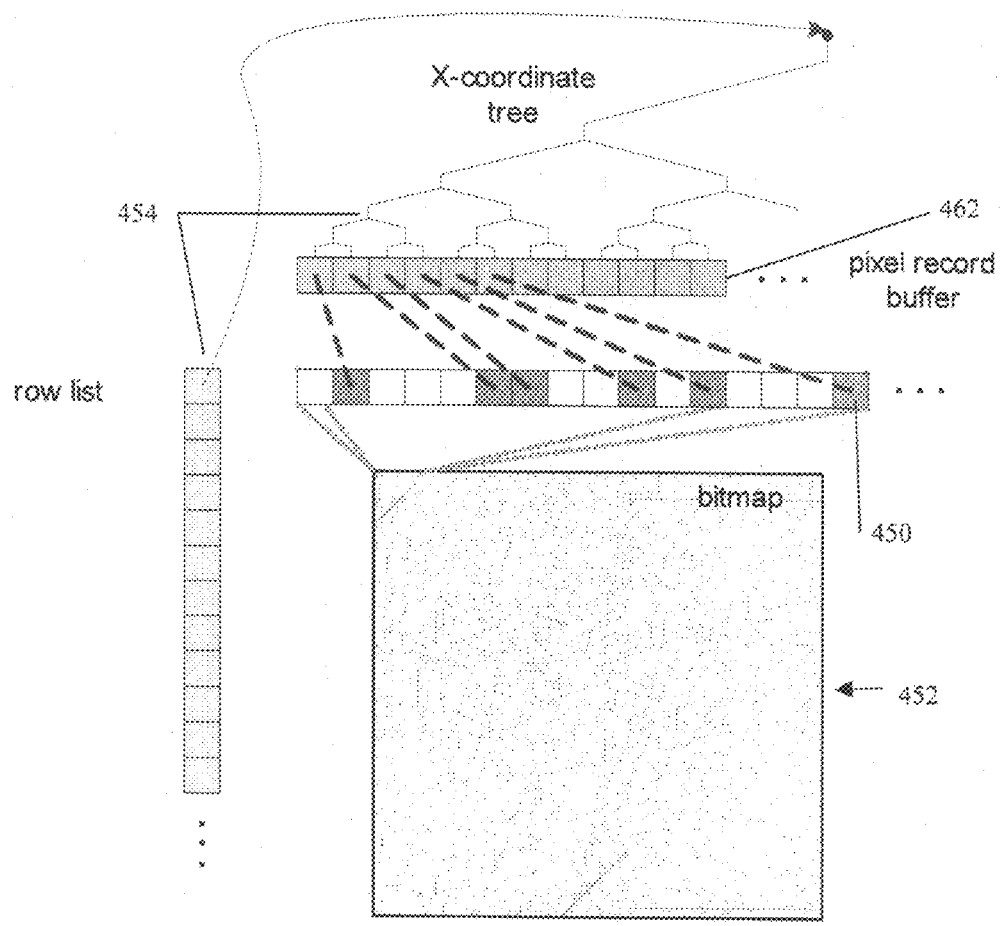
FIG. 4 is an example bitmap generated for the visualization representation of FIG. 12 showing backing data structures used in the generation.

Further, at step 508, the resized data in the reduced data set 213 is indexed (e.g. by a data structure 454 such as a hierarchical tree—see FIG. 4). Referring again to FIGS. 4, 14 and 15, at step 508 the module 406 updates the data structure 454 stored in the local storage 113 used to provide a vector representation of the data contained in the resized data set 213, so as to facilitate lookup of individual packet specifics that were summed during manipulation of the data points from the sets 211,213 (e.g. performed during rendering of the bitmap 452). The data structure 454 can be used by an analyst of the tool 12 to search the pixel record buffer 462 to get all data records pertaining to the packets (or other dimensional quantities) implicit in the summation of data for each of the pixels 450 represented in the displayed bitmap 452.

Overview of the Tool 12

Referring to FIGS. 14, the tool 12 of the processing system 100 can be built on a focus-plus-context architecture. The analyst is first presented with an overview by the module 400, for example a context view 470 (see FIG. 2) of the entire time period being examined that would be available in the reduced data set 211, based on the query 212 sent to the backend system 208 for the time period specified. Data points in this context view 470 (as shown in the resultant bit maps 452 of the visualization representation 10 for each of four different displayed discrete dimensions 142 versus the temporal dimension 140) represent a collection of packets in the temporal dimension 140, such that the count 144 is indicated by the pixels 450 by the linear-log colour scale 456 (see FIG. 10). By exploring this display, the analyst can discover areas of interest which can be selected for further exploration in a focus view 472 (see FIG. 3) generated by the module 402 in view of the additional display criteria for a subset of the data displayed in the context view 470. The focus view 472 is a single plot of packet data for a subset of the whole data span, resulting in finer resolution along the dimensions 140,142 displayed.

The discovery of salient data in both context 470 and focus 472 views, can be supported by zooming and panning operations, filtering and highlighting by the module 410, and alarm overlays by the module 404. In addition the dynamic aggregate resizing and application of the linear-log colour scale 456 by the module 124 with pixel drawing support by the module 412 can help quickly identify hot spots of activity in the displayed bit maps 452 of the visualization representation 10. Fuzzy highlighting and fuzzy filtering interactions of the module 410, as further described below, can aid exploration through fast-response, approximate highlighting and filtering.

Context View 470

Figure 2:
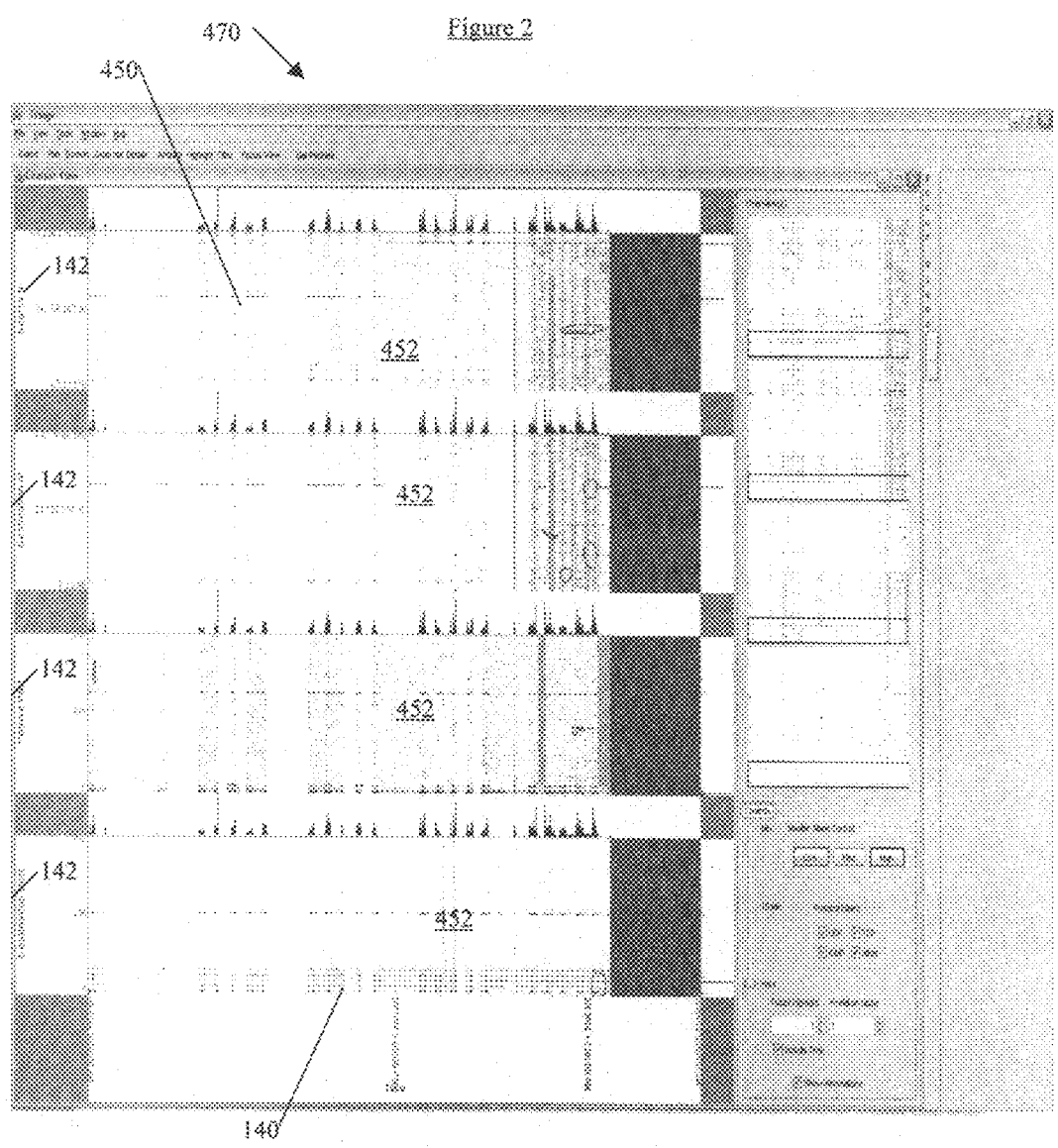
FIG. 2 is an example context view generated by the tool of FIG. 12.

Referring to FIG. 2, the context view 470 (e.g. visualization representation 10) shows one representation of all the major dimensions 140,142 of the reduced data set 211, as processed by the data manager 114, including pixels 450 representing the counts 144 as described above. The context view 470 can comprise four synchronized bitmap 452 plots of packet counts 144 over the major axes 142 all versus time 144, i.e. source port versus time, source IP versus time, destination port versus time, and destination IP versus time. These bitmap 452 plots cover the entire time period being analysed, up to a 4096 pixel by 2048 pixel virtual bitmap at the most zoomed out level and down to a 4096 pixel by 122,880 (=2048*60) pixel virtual bitmap, for example. At the largest granularity provided by the original data set tables 304, one hour per pixel, the most zoomed out level can represent over 85 (=2048/24) days of data that can be zoomed in to a resolution of one minute per pixel 450, for example.

Focus View 472

Figure 3:
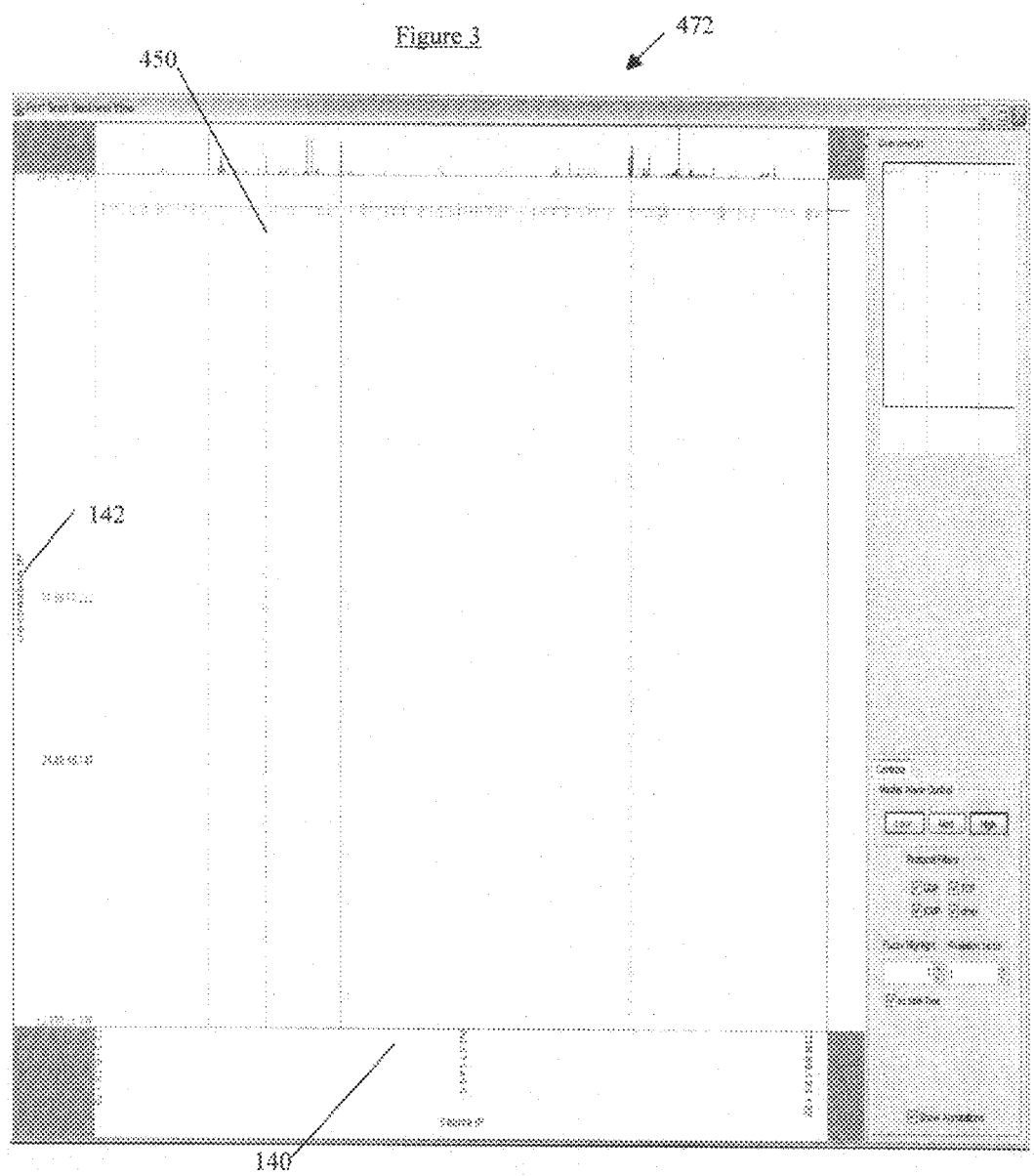
FIG. 3 is an example focus view generated by the tool of FIG. 12.

Referring to FIG. 3, the Focus view 472 shows Destination IP address 206a,b vs. Source IP address 204a,b (see FIG. 11). From the context view 470, the analyst using the tool 12 can select an area of interest and launch the asynchronous creation of the focus view 472. The processing system 100 will query the backend system 208 and plot a single view in the desired coordinate space for the indicated ranges of data. This view can display up to a 4096 by 4096 pixel virtual bitmap 452 and can represent down to a one hundredth second interval per pixel, for example. The construction of focus views 472 can happen asynchronously so that the analyst can spawn the generation of several focus views 472 (i.e. multithreaded). Generated views can then be displayed as they become available as they become available to the rendering process from the data manager 114.

Special Focus Views 472

In addition to focus views 472 that display subsets of the context view 470, focus views 472 can be generated by the module 402 for alternate axes pairs, for example source IP versus destination port. And special histogram focus views 472, for example, can be generated for single dimensions aggregated over time. Also, the data that is plotted can be counts of other dimension values as well as simply packet counts or aggregate data size. The systems 100, 208 can have two or more presets to aid the analysis of network 205 traffic, such as but not limited to: the port scan view and the ex-filtration view. The port scan view can display a count of distinct ports in a plot of Source IP versus Destination IP for the desired ranges of IP's, its purpose is to make a port scan visually apparent. The ex-filtration view can be a histogram view that shows aggregates of data size or packet count for each destination IP per hour of the day. This view is designed to make data ex-filtration optically salient.

Drill Through the Visual Representation 10

The final stage of an analysis of a suspicious network original data set 210 will likely be the examination of the original network packets and their datagrams. This is important if the analyst needs to identify the specifics of an attack from the entity 200. At any point, the analyst using the tool 12 can transform a selection of data points into the logical query 212 that will return and save as the reduced data set 211 representing a listing of the original raw packet level data set 210 that was imported into the backend system 208. In this case no binning or other summarization may occur in the result data set 211.

Process Methodology of the Systems 100,208

Representing and rapidly interacting with massive amounts of the original data set 210 through the generated bitmaps 452 is the capability of the systems 100, 208 for acting simultaneously as a method of visualization and as a strategy for manipulating and interacting with large amounts of data of the original data set 210. The systems 100,208 operation that we describe below define the ways in which the transformation from packet data to pixel 450 is performed, operating with data image tiles, and translating data manipulation operations to corresponding image operations.

Vector Representation and Tiling

For the module 124 operation, in practice the density of packet data in the space of potential network 205 packets is very small, especially as you examine a smaller and smaller granularity of time. It is recognised that the functionality of the module 124 can also be shared or performed by the module 302 if desired, e.g. module 302 could be contained in module 124, where module 302, 406 and 124 could all be in manager 114. If we stored a bitmap 452 of data points for this type of data, a lot of the memory usage would be taken up representing empty areas of the space. For example there are over 4 billion IP addresses, but practically a typical network may not see more than a few tens of thousands over a given month (see, for example, 144), furthermore those addresses 204a,b, 206a,b may only be pertinent for a few hours over the month. In the 50 million packet test data mentioned above the density of packets aggregated by hour in the source IP by time space is as low as 0.5%, aggregated by minute is under 0.05%. One way to help avoid this inefficiency is to store a list of point coordinates and values in the data structure 454 (see FIG. 4). In operation of module 406, storing each data point, or record, this way takes, abstractly, one positional datum and one value datum. This is a larger per-data-point information footprint than points in a bitmap which would store only value (i.e. count 144), positional data are implied by position in the data structure 454. In that case, position of the value is maintained in the structure 454 by "no-data" values inserted between data points. Since the data of the reduced data set 211 is sparse, the "no-data" stand-ins will overwhelm the few data points making the bitmap structure less efficient in overall memory 102 usage than the data structure 454. In graphic applications this method would be referred to as a vector representation. For the example above, the improvement in memory efficiency can increase dramatically as you examine the data in finer and finer detail. This list of data, or the vectors, for a given area of the data space will be referred to generically as the pixel record buffer 462. The pixel record buffer 456 coupled with row and column indices will be referred to generically as a data space 480, further discussed below. Accordingly, it is recognised that the reduced data set 211 can be represented as a data space 480 including one or more of the data chunks 482, further discussed below.

Clipping Process

For very large spaces, such as the ones we are dealing with, we will still have many points to process each time we want to generate the resultant visualization representation 10 to show the analyst. An image processing solution for alleviating this computational intensity is clipping by the module 406 operation, the method of ignoring graphical objects that will not appear in the visualization representation 10 that is being rendered to the user of the tool 12.

Referring to FIG. 4, the row list and x-coordinate tree of the axis data structure 454 point into the pixel record buffer 462 so that it can be used to efficiently render a clipped bitmap 452. In order to render a clipped region of the pixel record buffer 462, the tool 12 efficiently determines what points rest within the rendered region. To do this an axis data structure 454 can be maintained for each pixel record buffer 462. The axis maintains an ordered list of rows corresponding to every row in the virtual bitmap 452. Each row contains a binary tree (for example) storing the x-coordinate of the data points that are in that row. The tree helps to provide an efficient means to find the nearest data point in that row given an x-coordinate value. Because the row list is complete and ordered we can always jump immediately to the correct row to render. Furthermore the pixel record buffer 462 is ordered by y- and then x-coordinate. This means that once we determine where to begin we can read consecutive records from the buffer 462 until we fall out of the clipping region and begin the process again.

Referring to FIG. 5, an example algorithm 466 is shown for rendering a clipped region of the pixel record buffer 462 using the axis data structure 454. To help improve performance further, operations such as panning can make use of areas of the pixel record buffer 462 that have already been rendered. These images are re-used, in effect making the clipping region for rendering that much smaller, and patched together with the new bitmap 452 to make a new visualization representation 10. The performance gain from this heuristic will depend on the manner and degree of the analyst's panning.

Tiling for Data Spaces 480

Figure 6:
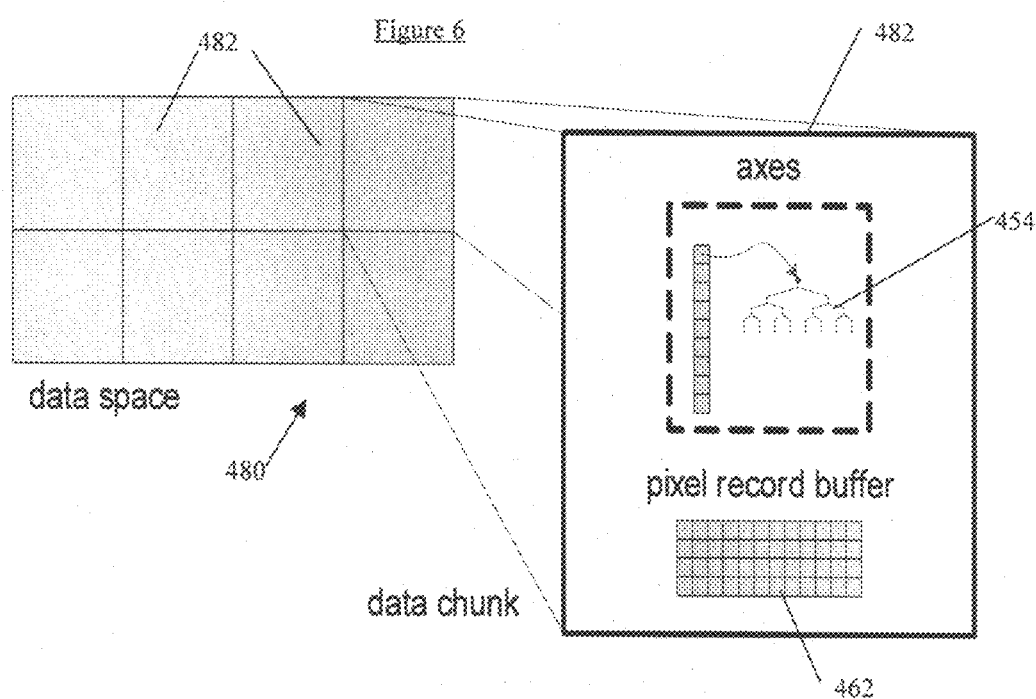
FIG. 6 is a diagram of tiling for the processed data set of FIG. 11.

The details above describe how the tool 12 can render the pixel record buffer 462 efficiently. These methods may not address potential memory problems that could arise if the tool 12 attempted to store a single pixel record buffer of 50 million pixels (i.e. an extreme data size larger than memory 102 capacity). This problem can be partially solved by the module 406 (and/or module 302) operation by generating pixel record buffers 462 of fixed size for a given resolution using the dynamic binning process described above. However, database queries 212 are time consuming and can require considerable overhead time per query. So, though transmitting only the data necessary can be part of the solution, we can also (or in substitution) try to transmit as much of the original data set 210 in the tables 304 as we can per query 212 to reduce the overall number of queries 212 used by the processing system 100. As described above, a given context view 470 can contain four virtual bitmaps 452 (for example) of as much as 4096 by 122,880 pixels, the collection of data points represented by this virtual bitmap is referred to as the data space 480. Referring to FIG. 6, the data space 480 is made up of a grid of data chunks/portions 482. The data space 480 can have a maximum size and can correspond to a portion of the data set 210 retrieved from the tables 304 in the backend system 208 based on the query 212. The time range of the data space 480 and it's maximum allowed size in pixels are used to determine the table 304 used and the degree of summarization in the binning process 302 when responding to query 212. In this way the resolution along time (dimension 140) and other axes (dimensions 142) is altered to cap the maximum possible number of data points returned. The relationship between queries 212 and data spaces 480 is one of fragmentation and format. A logical query 212 can correspond to one or more data chunks 482 (depending on available memory for storing the result sets 211a). A set of one or more queries 212 are the description used by module 302 whose results 211a are interpreted by module 406 to generate a set of data chunks 482 that together comprise the data space 480 that is used by module 124 and other modules to generate the visual representation 10, including the bitmap 452. In this example the vectorized resultant reduced data set 211 and the data space 480 representation can be thought of as equivalent.

This use of data spaces 480 helps allow the processing system 100 to maintain control over the maximum amount of data that it expects to process when generating the visualization representation 10. However, data spaces 480 can still be very large and having many of them in memory 102 at once may not be possible. Also the analyst will not usually be able to see the whole data space 480 at once especially when dealing with very large data spaces 480. To help optimize memory 102 usage and leverage the partial visibility, data spaces 480 can be broken into the data chunks 482. The data chunks 482 represent logical areas of the data space 480. The data space 480 is divided into a grid and each section is represented by the data chunk 482. Note that the actual range of data contained in a data chunk 482 may not be identical to the range of data that it represents. The data chunk 482 contains an axis/data structure 454 and pixel record buffer 462 for its portion of the data space 480. When the VI manager 112 (see FIG. 12) requests data for drawing, the data space 480 will determine which data chunks 482 are required and coordinate their retrieval from the data manager 114. The data manager 114 will return the data chunks 482 already loaded in memory 102 if possible. If the data chunk 482 is not currently loaded, the data manager 114 will search the local storage 113 for a cached version and load it into memory. If memory 102 usage gets too high, the data space 480 will find infrequently accessed or logically distant data chunks 482 that may be unloaded from memory 102, as directed by the module 406. When a data space 480 is initially requested from the data manager 114 and does not reside in local storage 113, the data space 480 is generated from the data retrieved from the backend data source 208 via the data reduction module 302 and processed by the vector module 406. When the data manager 114 receives a new data space 480, the data space 480 and its data chunks 482 can be stored locally 113 so that memory 102 usage can be flexibly managed.

Multi-dimensional Cubes

The tiling method described above can give the system 100,208 much greater flexibility to handle large data spaces 480 in terms of memory 102 usage and rendering time. However, the binning that occurs in building the data space 480 can hinder exact knowledge of the packets that are represented by a data point, or pixel 450. Exact packet data is desirable for some operations such as highlighting and filtering by the module 410. Retrieving this data from the backend system 208 is not generally fast enough for smooth interaction with the analyst via the tool 12. However, highlighting data points or filtering out data points based on up to 5 dimensions (for example) of packet level criteria may not be possible if we only know the ranges on two of those dimensions by virtue of the x and y coordinate in that data space 480. The system 100,208 can store more than the coordinate values in the pixel record buffer 462. Each entry in the buffer 462 contains the x and y coordinate in bins and can also contain the extreme values along the other dimensions 140,142 that bound the range of all the packets aggregated in this data point. The pixel record buffer 462 contains the virtual bitmap 452 coordinates and also a multi-dimensional bounding cube of the subsumed packets.

Navigating Tiles

We have now described the way that we compute tiles of data and given some of the processing time considerations that this approach addresses. The advantages of using tiles as we do are made even more evident when we consider the final result where the analyst is navigating the data space 480. All navigation operations can become a matter or locating the correct tile, loading it, and rendering it.

Furthermore the most navigation operations involve neighbouring tiles accessed in sequence, so performance gains can be exaggerated by pre-caching a currently accessed tile's neighbours in memory so it is ready to render as soon as it is required. For the context views 470, the systems 100,208 use data spaces 480 at multiple levels of detail at different time resolutions. The tiles for these data spaces 480 are all generated so that zooming interactions, in addition to panning and scrolling, benefit from the use of tiles. In graphics terms this set of layered level of detail tiles would be called a pyramid.

Performance

Processing the tiles for the data spaces 480 and saving them to local disk can create a separation of interaction and processing requirements. Loading a data chunk 482, or tile, from disk and rendering it may take a relatively short period of time compared to accessing all respective data of the processed data set 211. Generating the data chunks 482 will take processing resources but can be done before the visualization representation 10 is ultimately rendered. Once the tiles are computed there is no theoretical limit to the size of the data space 480 that can be used for user analysis and interaction, aside from disk space 113. Interaction times for larger data spaces 480 may only be affected by the time it takes to locate the correct data chunk 482. This function can be logarithmic in the number of data chunks 482, which in turn can be proportional to the square root of the number of data points. To begin with, the number of data chunks 482 is typically low compared to the number of packets so we can consider even this cost to be negligible in practice. In practice the data set described above of just under 52 million packets has the following breakdown in terms of processing times, for example:

| | |
|---|---|
| Server | Pentium IV dual 2.4 GHz, 2 GB RAM, 150 GB RAID 5 disk array |
| Workstation | Pentium IV 3 GHz, 1 GB RAM, 40 GB IDE disk |

| Step | Time |
|---|---|
| Populate Database | ~2.5 hours |
| Generate All Data Chunks for the context view (>1000 tiles) | 10-15 minutes |
| Load and render a data chunk | <2 seconds |

Fuzzy Highlighting and Filtering

Figure 7:
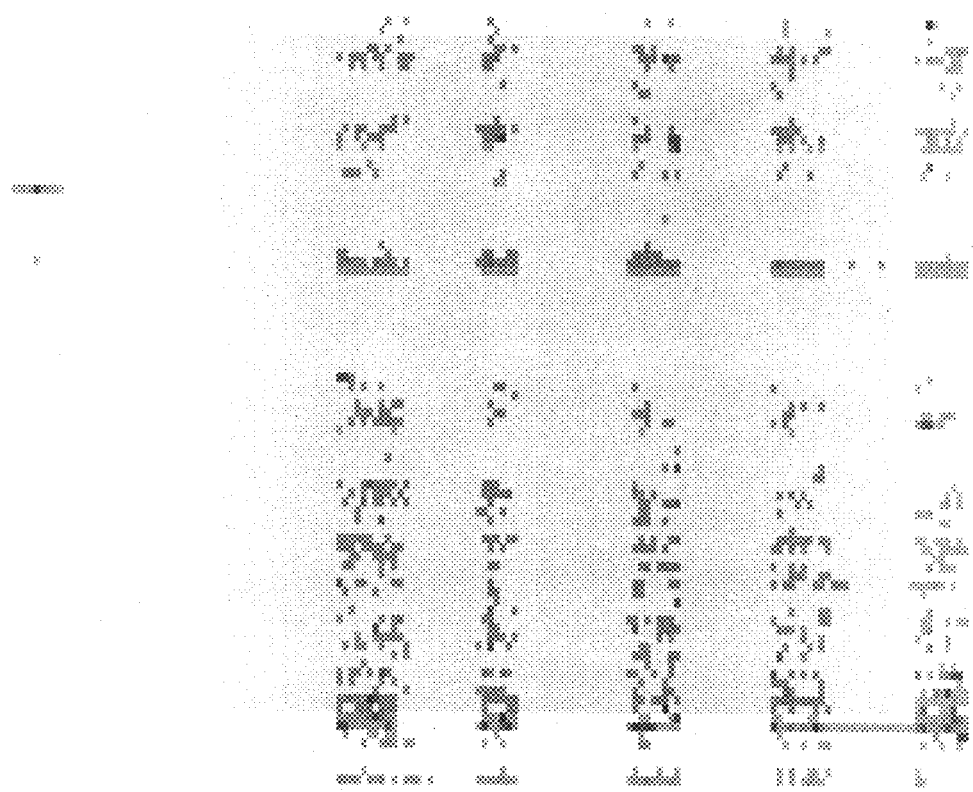
FIG. 7 is an example of fuzzy pixels for the processed data set of FIG. 11.

Referring to FIG. 7, sample fuzzy highlighting is show via the filter module 410. Colour coded (e.g. red-highlighted) pixels of the bitmap 452 can show items that may meet the specified criteria. Notice that not all the data points within the affected area would be coloured as meting the specified criteria. Storing the bounding cube of each data point in the multi-dimensional space of potential packets can have a noticeable memory cost, but can provide a means for the tool 12 to offer approximate operations such as fuzzy highlighting and filtering to the analyst. Typically, with only bin coordinate data, performing an operation such as filtering by protocol would be impossible without querying 212 the backend system 208 and comparing the results to those in the current data space 480. By having data on the bounds of the packets represented by the data point we can test for intersection with that cube and display a superset of the points that would qualify if we ran the query and processed the results.

For example, to fuzzy highlight by the module 410 all records that contain a specific source IP address 204a,b, 206a, b, the module 410 will colour all pixels 450 in the bitmap 452 that represents a data point whose record in the pixel record buffer 462 includes the target IP in the stored range of source IP values subsumed. This may not guarantee that the source IP value in question was actually aggregated into the data point that the pixel 450 represents. However, if a data point containing the source IP is represented by that pixel 450 (remembering aggregation of count 144 was performed for all resolution levels of the tables 304), then the pixel 450 is shown to be fuzzy highlighted. The analyst can have the option of exactifying the fuzzy highlighted values by performing a specific database query 212 and colouring the pixels 450 based on the results.

Fat Pixels

Figure 9:
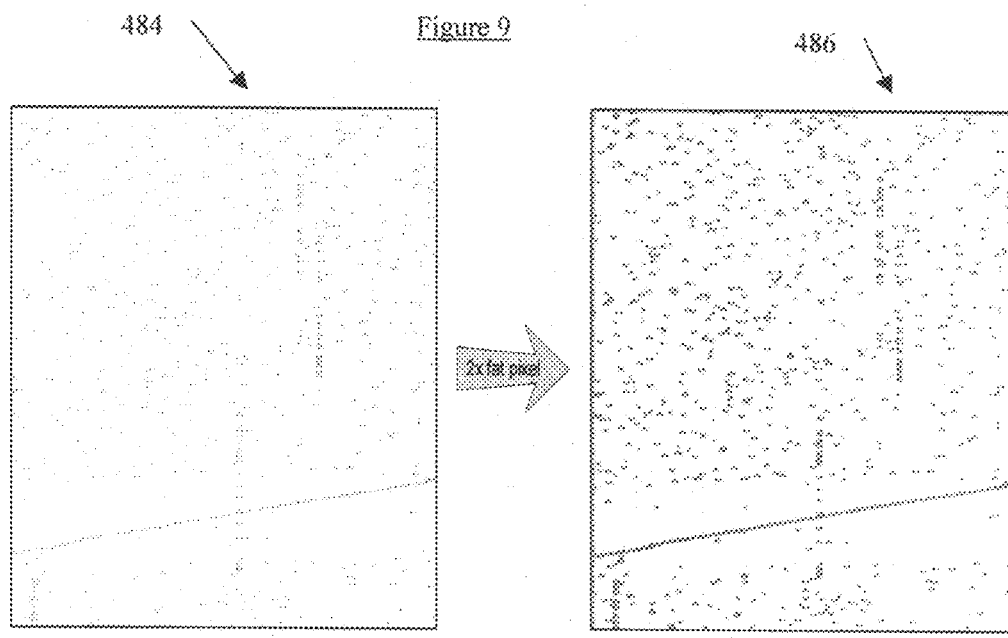
FIG. 9 is an example of fat pixels for the processed data set of FIG. 11.

A further operation of the module 412 can be fat pixel rendering, as shown in FIG. 9 for second-level data before 484 and after 486 fat pixilation. At a pixelation level of one or less it can be difficult at times to make out the details of a sequence of data points. To help this problem the analyst may use a method of fat pixel rendering. Fat pixel rendering draws data space pixels as an area of colour on the bitmap 454, instead of a single screen pixel 450, but placed at the coordinates as if data points were all single pixels 450, i.e. a pixelation level of one. The effect is that nearby data points may overlap, but overall patterns may be more easily distinguished. This is analogous to painting the same picture in a point list style but using a larger brush.

Annotation

Referring to FIG. 14, the module 404 can add a dimension of layered data to the visualization representation 10 by allowing the analyst to sketch directly in the data space 480 and attach notes to regions of the massive data space 480. These notes and annotations can provide helpful reminders and highlights of interesting areas of the space. Furthermore the notes are attached to the associated range of the axis pair dimension that it is drawn in. As such it will reappear whenever these data, in those dimensions, are represented. This way the analyst can also watch the annotation translate through different focus views 472 and help maintain context.

Alarm Overlays

Finally, the system 100,208 can provide via the module 404 an additional dimension of data through the use of overlays. In this case of examining network data, the tool 12 provides overlays for alarm data generated by various intrusion detection systems (attacks by the entity 200—see FIG. 11). These alarms are associated with packets and indicate an estimated level of severity. Alarms are semi-transparent geometric shapes that lie over the affected data points/pixels 450. Alarms can provide a good starting point for investigations, and patterns in alarms can be just as important as patterns in packet data.

Example Operation of Systems 100, 208

Figure 16:
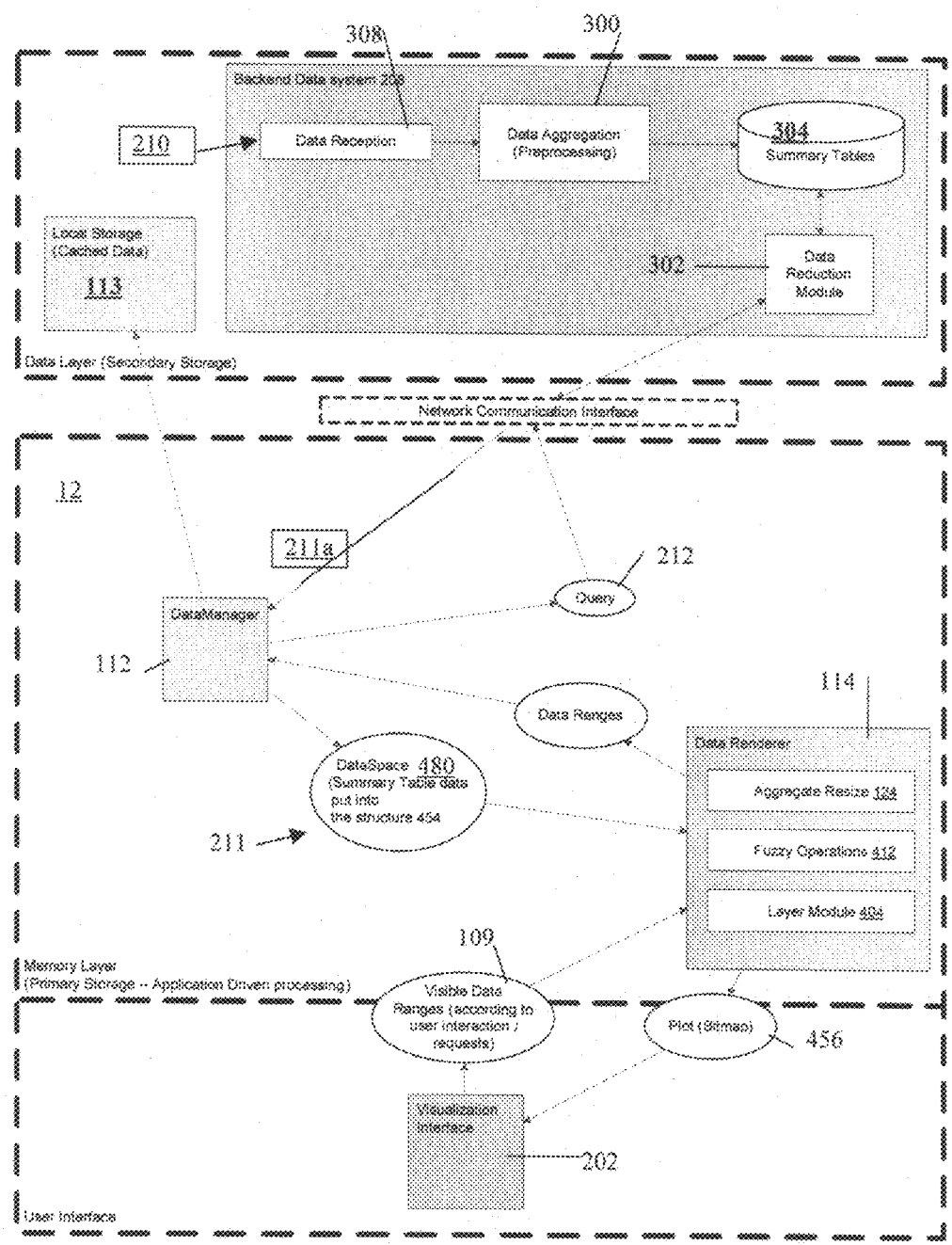
FIG. 16 is a further example configuration of the systems of FIG. 11.

Referring to FIG. 16, the backend system 208 provides for data pre-processing by module 300 upon receipt of the original multidimensional data set 210. The resultant processed data is stored in the individual summary tables 304 of differing granularity of a continuous dimension 140 of the original data set 210. The data reduction module 302 receives a logical query 212 from the processing system 100 via the interface 306 and then proceeds to select an appropriate one of the tables 304 (or tables 304 if appropriate) to produce a reduced data set from the data points contained in the selected table 304. It is recognised that the query 212 can have parameter(s) including at least one of available memory of the computer, a range of a continuous dimension of the multiple dimensions, and a level of detail for at least one dimension other than the continuous dimension, for example. The module 302 produces the reduced data set 211a that are ultimately converted to a data space 480, including construction of the data structure 454 (see FIG. 4). The data space 480 is constructed dynamically (on the fly) using the visualization manager 114 (e.g. a data renderer) to produce the resized data set 213 for use in generating the appropriate bitmap 452 (display of pixels) on the VI 202. The visible data ranges are communicated by the user to the VI manager 114 via user events 109. It is recognized that the data manager 112 will first check the local storage 113 for suitable data (e.g. check the cache) before beginning the construction of the data space 480 and storing same in the cache. It is recognized that the user events 109 include information useful in formulating the query 212 parameters based on the desired view 470, 472 (see FIGS. 2 and 3). It is recognise that the VI manager 114 can coordinate other rendering operations, such as fuzzy operations and layering.

Example Applications of Systems 100, 208

We have discussed some of the innovations introduced. Now we will illustrate how some of these come into play during specific network forensic tasks. The context 470 plus focus 472 workflow is well suited to general searches through the data set for suspicious activity or evaluating hypotheses.

Finding a Low and Slow Scan

A port scan is when an attacker 200 probes the target system 205 or network for open ports. The purpose is to determine the routes available to the attacker for infiltrating the target. There are two kinds of scans, vertical, where multiple ports on a single system are probed, and horizontal, where a few ports on many systems, perhaps from the same network 205, are probed. If an attacker is patient it is easy to hide the scan by probing infrequently over a prolonged period of time, this is a low and slow scan. By spreading out the time period, the attacker can avoid detection by systems that cannot retain a long history of activity. In this respect the systems 100, 208 are ideally suited for finding low and slow scans due to it's ability to display lengthy time periods.

If an analyst would like to discover a low and slow scan, perhaps after some suspicion is raised through exploration of the focus 472 and context 470 views, he can use the scan detection focus view. Scan detection view is a preset focus view 472 that displays a count of distinct ports in a plot of Source IP versus Destination IP for the desired ranges of IP's. In this view vertical scans will appear as hot pixels 450, dark in colour or even red, for example, according to the linear-log colour scale 456, since one pair of source and destination IP have communicated on many different ports. If this attack is distributed across several computers the points may be less hot but arranged in a vertical line along the column belonging to the target system IP. If the attacking computers are from the same domain then their rows could appear close together, since the IP's are ordered. In this case the aggregation performed on a suitably zoomed out view can combine the counts 144 of the attacking systems and so make the data point that much hotter and more obvious. This may not be the case if a typical image resize was used as that would preserve the colour information and so make individual points less obvious.

In the scan detection view, a horizontal scan could appear as a horizontal line in the plot. If the view is suitably zoomed out then gaps in the line would disappear potentially making the line even more obvious as it becomes more solid and darker. Similarly aggregation along the attacker's IP dimension may help make the line darker in the same manner described for vertical scans if the scan is distributed across multiple nearby computers.

This is a good example of how the aggregate resizing not only helps the analyst explore larger original data sets 210 but also enhances the capability of the application by making certain features more prominent. In general, any density in the data will become more apparent as the analyst zooms out.

Finding an Ex-filtration

Ex-filtration is the transmission of data from within the network 205 to an outside system 200 where it can be collected by the attacker. This may be the result of a compromised system within the network 205, or a leak of information from an insider with authorized network access.

To explore the possibility of an ex-filtration, the analyst can use the preset ex-filtration focus view 472. This is a histogram view (for example) that shows aggregates for each destination IP per hour of the day. Focus 472 and context 470 views always contain summary histograms to indicate the total values of each row and column across the data space 480 and simultaneously an estimate of the totals of currently visible values. Since the histogram aggregations per hour of day are returned by the backend system 208 and stored on the processing system 100 it is easy for the analyst to combine hours dynamically, for example combining hours to show two histograms for comparing normal daytime versus overnight totals. The same view can be generated for the source IP field. This way, ex-filtrations all from one machine or all to one machine will stand out.

For both finding scans and identifying ex-filtrations, the large amount of data stored allows the analyst to detect trends that would not be noticeable for shorter time spans of data.

These examples illustrate how aggregate resizing, the colour scale, and the large amount of traffic data stored work together to increase the effectiveness of the analyst. Furthermore, once the offending packets or IP's are identified then they can be highlighted in the context view 470. In this way the analyst can find other related suspicious traffic over the large time span that is presented.

Visual Clusters and Patterns

The views that tool 12 provide of network data 210 will necessarily make regular patterns salient. These patterns are often the result of the habitual behaviours of the people who use the network. Visual detection of these patterns combined with algorithmic clustering techniques provide a powerful process by which the tool 12 can help analysts detect these behaviours and then eliminate those that are deemed normal from further investigation. This leaves unusual behaviour for subsequent analysis. Trimming the data this way can greatly increase the efficiency of the analyst.

The tool 12 deals with packet data 210 at the raw database level as well as the processed pre-rendered 211 level. This provides two opportunities for algorithmic clustering, so it might operate on features that are more pronounced at each of these levels.

Furthermore the visual nature of the data representation and the human affinity for pattern recognition provide the opportunity for a mixed initiative computer and human information-interaction that can achieve better results than either alone. Involving the analyst to guide and confirm clustering based on their visual analysis can make the process more robust. For example the analyst might begin by specifying initial centroid locations to cluster around and then confirm the results through a clustering based overlay.

We claim:

1. A system for processing a stored original data set for subsequent display on a user interface of a computer, the original data set having multiple dimensions including a temporal dimension and a number of original data points greater than the number of pixels available on the user interface for displaying a display of pixels for representing the data values of each of the original data points, the system comprising:
   a data reduction module configured for reducing the original data set to produce a plurality of reduced data sets, each having a number of reduced data points less than the number of original data points and at a respective different aggregated resolution of the original data set based on a selected aggregation dimension, and configured for selecting a reduced data set from the plurality of reduced data sets to match an appropriate aggregated resolution associated with a received query specifying a temporal range;
   a data resizing module for dynamically resizing the selected reduced data set to produce a resized data set suitable for use in generating the display of pixels appropriate to a pixel display constraint of the user interface defining the number of available pixels in the display of pixels, the module configured for combining the individual data values of selected adjacent ones of the reduced data points in the reduced data set and assigning a combined value based on the combining to a corresponding resized data point in the resized data set, the resized data set having a number of resized data points less than the number of reduced data points; and
   a pixel module configured for using a predefined colour scale for assigning a unique colour of a plurality of colours to the combined value of the resized data point included in the display of pixels.

2. The system of claim 1 further comprising a vector module for transforming the reduced data set from a tabular format to a memory format including a data structure for facilitating access to the individual data values of the reduced data set used to generate the combined value.

3. The system of claim 2, wherein the data structure includes a pixel record buffer associated with the display of pixels.

4. The system of claim 3, wherein the display of pixels is represented as a bitmap.

5. The system of claim 1 further comprising a filtering module for altering a display characteristic of individual pixels in the display of pixels using at least one criterion based on one of the dimensions of the multiple dimensions.

6. The system of claim 5, wherein the altering of the display characteristic includes operations selected from the group comprising: fuzzy highlighting; fat pixels; and filtering of selected data detail.

7. A method for processing a stored original data set for subsequent display on a user interface of a computer, the original data set having multiple dimensions including a temporal dimension and a number of original data points greater than the number of pixels available on the user interface for displaying a display of pixels for representing the data values of each of the original data points, the method comprising the steps of:

reducing the original data set to produce a plurality of reduced data sets, each having a number of reduced data points less than the number of original data points and at a respective different aggregated resolution of the original data set based on a selected aggregation dimension, and configured for selecting a reduced data set from the plurality of reduced data sets to match an appropriate aggregated resolution associated with a received query specifying a temporal range;

dynamically resizing the selected reduced data set to produce a resized data set suitable for use in generating the display of pixels appropriate to a pixel display constraint of the user interface defining the number of available pixels in the display of pixels by combining the individual data values of selected adjacent ones of the reduced data points in the reduced data set, the resized data set having a number of resized data points less than the number of reduced data points;

assigning a combined value based on the combining to a corresponding resized data point in the resized data set; and applying a predefined colour scale for assigning a unique colour of a plurality of colours to the combined value of the resized data point included in the display of pixels.

8. The method of claim 7 further comprising the step of transforming the reduced data set from a tabular format to a memory format including a data structure for facilitating access to the individual data values of the reduced data set used to generate the combined value.

9. The method of claim 8, wherein the data structure includes a pixel record buffer associated with the display of pixels.

10. The method of claim 9, wherein the display of pixels is represented as a bitmap.

11. The method of claim 7 further comprising the step of altering a display characteristic of individual pixels in the display of pixels using at least one criterion based on one of the dimensions of the multiple dimensions.

12. The method of claim 11, wherein the altering of the display characteristic includes operations selected from the group comprising: fuzzy highlighting; fat pixels; and filtering of selected data detail.

13. The system of claim 1, wherein the plurality of reduced data sets is based on a base dimension of said multiple dimensions selected from the group comprising: a continuous dimension and a non-continuous dimension.

14. The system of claim 13, wherein the plurality of reduced data sets is based on more that one continuous dimension such that each of the continuous dimensions have individual sets of reduced data sets in the plurality of reduced data sets.

15. The method of claim 7, wherein the plurality of reduced data sets is based on a base dimension of said multiple dimensions selected from the group comprising: a continuous dimension and a non-continuous dimension.

16. The method of claim 15, wherein the plurality of reduced data sets is based on more that one continuous dimension such that each of the continuous dimensions have individual sets of reduced data sets in the plurality of reduced data sets.

* * * * *